US012597613B2

(12) United States Patent
Lu et al.

(10) Patent No.: US 12,597,613 B2
(45) Date of Patent: Apr. 7, 2026

(54) NEGATIVE ELECTRODE COMPOSITION, NEGATIVE ELECTRODE SLURRY, NEGATIVE ELECTRODE PLATE, AND SECONDARY BATTERY AND ELECTRICAL DEVICE CONTAINING SAME

(71) Applicant: CONTEMPORARY AMPEREX TECHNOLOGY (HONG KONG) LIMITED, Hong Kong (CN)

(72) Inventors: Lei Lu, Ningde (CN); Gaihong Zhu, Ningde (CN); Shisong Li, Ningde (CN); Xinghui Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 7 days.

(21) Appl. No.: 18/448,023

(22) Filed: Aug. 10, 2023

(65) Prior Publication Data

US 2023/0395803 A1 Dec. 7, 2023

Related U.S. Application Data

(63) Continuation of application No. PCT/CN2022/079204, filed on Mar. 4, 2022.

(51) Int. Cl.
*H01M 4/62* (2006.01)
*H01M 4/04* (2006.01)
*H01M 4/02* (2006.01)

(52) U.S. Cl.
CPC ......... *H01M 4/622* (2013.01); *H01M 4/0404* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 10,601,027 | B2 | 3/2020 | Du et al. | |
| 2013/0209877 | A1* | 8/2013 | Kren | H01M 4/386 429/211 |
| 2021/0083264 | A1* | 3/2021 | Jiang | H01M 4/134 |

FOREIGN PATENT DOCUMENTS

| | | | | |
|---|---|---|---|---|
| CN | 101334592 | * | 12/2008 | G03G 5/05 |
| CN | 101420026 | A | 4/2009 | |
| CN | 103172805 | A | 6/2013 | |
| CN | 103181007 | A | 6/2013 | |

(Continued)

OTHER PUBLICATIONS

The World Intellectual Property Organization (WIPO) International Search Report for PCT/CN2022/079204 Sep. 28, 2022 6 pages (including English translation).

(Continued)

*Primary Examiner* — Barbara L Gilliam
*Assistant Examiner* — Angela J Martin
(74) *Attorney, Agent, or Firm* — ANOVA LAW GROUP, PLLC

(57) ABSTRACT

A negative electrode composition includes a negative active material and a plasticizer. The plasticizer includes a first plasticizer. The first plasticizer includes at least one of a POSS-containing block copolymer or a polyester containing a —[O—CH($CH_3$)—C(=O)]— structural unit.

14 Claims, 2 Drawing Sheets

(56) References Cited

FOREIGN PATENT DOCUMENTS

| | | | | |
|---|---|---|---|---|
| CN | 109841789 A | 6/2019 | | |
| CN | 109841835 A | 6/2019 | | |
| CN | 110112415 A | 8/2019 | | |
| CN | 110649313 A | 1/2020 | | |
| CN | 111916746 A | 11/2020 | | |
| CN | 111933905 A | 11/2020 | | |
| JP | 2011216332 | * 10/2011 | ............ | Y02E 60/10 |
| JP | 2016028376 A | 2/2016 | | |

OTHER PUBLICATIONS

The World Intellectual Property Organization (WIPO) IWritten opinion for PCT/CN2022/079204 Sep. 28, 2022 6 pages (including English translation).
The European Patent Office (EPO) The Partial Supplementary European Search Report for Application No. 22919268.7 Jan. 23, 2025 13 Pages.

* cited by examiner

NEGATIVE ELECTRODE COMPOSITION, NEGATIVE ELECTRODE SLURRY, NEGATIVE ELECTRODE PLATE, AND SECONDARY BATTERY AND ELECTRICAL DEVICE CONTAINING SAME

CROSS-REFERENCE TO RELATED APPLICATION

This application is a continuation of International Application No. PCT/CN2022/079204, filed on Mar. 4, 2022, the entire content of which is incorporated herein by reference.

TECHNICAL FIELD

This application relates to the technical field of secondary batteries, and in particular, to a negative electrode composition, a negative electrode slurry, a negative electrode plate, a secondary battery, and an electrical device containing the secondary battery.

BACKGROUND

A secondary battery is charged and discharged by reciprocally intercalating and deintercalating active ions between a positive electrode and a negative electrode, and is characterized by a high energy density, a long cycle life, no pollution, and no memory effect. Therefore, secondary batteries, as clean energy, have been gradually applied to a wide range of fields from electronic products to large-sized devices such as electric vehicles to meet the sustainable development strategy of the environment and energy. This gives rise to higher requirements on the energy density, cycle performance, safety performance, and other performance of the secondary batteries.

The energy density is considered to be the biggest bottleneck that currently constrains the development of the secondary batteries. To achieve the technical goal of a high energy density of the secondary batteries, the manufacturing process needs to be continuously improved and perfected in addition to continuous breakthroughs and innovations in materials. With respect to the manufacturing of a secondary battery, increasing the thickness of a negative film layer and increasing the coating speed are important approaches to improving the energy density and production capacity of the secondary batteries.

However, with the increase in the thickness of the negative film layer and the coating speed, the negative film layer is prone to break apart during drying. In addition, an excessive thickness of the negative film layer may lead to problems such as infiltration difficulty of an electrolytic solution and poor kinetics. Therefore, existing negative electrode plates still need to be improved.

SUMMARY

An objective of this application is to provide a negative electrode composition, a negative electrode slurry, a negative electrode plate, a secondary battery, and an electrical device containing the secondary battery to achieve relatively high cycle performance in addition to a relatively high energy density of the secondary battery.

To achieve the above objective, a first aspect of this application provides a negative electrode composition. The negative electrode composition includes a negative active material and a plasticizer. The plasticizer includes a first plasticizer and optionally a second plasticizer. The first plasticizer includes at least one of a POSS-containing block copolymer or a polyester containing a —[O—CH($CH_3$)—C(═O)]— structural unit. The second plasticizer includes an organic solvent with a boiling point $T_m$ of 160° C. to 250° C.

The POSS-containing block copolymer includes a Si—O—Si bond and a polar group that contains a lone electron pair. The Si—O—Si bond can increase flexibility of the plasticizer. The polar group that contains a lone electron pair is highly hydrophilic, and can ensure high solubility of the plasticizer in water. Therefore, the plasticizer can be uniformly dispersed in the negative electrode slurry, and diffused into a molecular network of additives such as a polymer binder and a carboxymethyl cellulose (CMC) thickener, so as to reduce the strong hydrogen bonding effect between molecules of the additives. Therefore, during the drying, the polymer binder molecules and the CMC molecules can move sufficiently to release the stress generated during the drying and increase the flexibility of the negative film layer. Further, the polar group that contains a lone electron pair in the plasticizer endows the plasticizer with high affinity for an electrolytic solution and relatively high $Li^+$ conductivity. Even if a residue of the plasticizer remains in the electrode plate, the residue will not impair the performance of the electrolytic solution in infiltrating the negative film layer or the kinetic performance of the secondary battery.

The polyester containing the —[O—CH($CH_3$)—C(═O)]— structural unit includes a carbon-oxygen single bond and an ester group. The carbon-oxygen single bond endows the plasticizer with high flexibility. The polar ester group can interact with the polymer binder molecules and the CMC molecules to reduce the strong hydrogen bonding effect between the polymer binder molecules and the CMC molecules. Therefore, during the drying, the polymer binder molecules and the CMC molecules can more easily implement a conformational transition to relax, so as to release the stress generated during the drying and increase the flexibility of the negative film layer. Further, the ester group included in the plasticizer endows the plasticizer with high affinity for the electrolytic solution and relatively high $Li^+$ conductivity. Even if a residue of the plasticizer remains in the electrode plate, the residue will not impair the performance of the electrolytic solution in infiltrating the negative film layer or the kinetic performance of the secondary battery.

Therefore, when the negative electrode composition in this application is used to form the negative film layer of the negative electrode plate, the negative electrode composition can effectively reduce the brittleness of the negative film layer, and in turn, reduce the degree of cracking of the film layer during the drying of the negative electrode plate.

In any embodiment of this application, the plasticizer includes a combination of the first plasticizer and the second plasticizer. The polar groups in the first plasticizer and the second plasticizer, such as ester group, hydroxyl, or cyano, can interact with the groups in the polymer binder molecules or thickener molecules. The polar group in the plasticizer interacts with the polymer binder molecules or the thickener molecules to reduce connection points between the polymer binder molecules or connection points between the thickener molecules, thereby replacing the original strong hydrogen bond between the polymer binder molecules or thickener molecules, and in turn, weakening the strong intermolecular force of the polymer binder molecules or thickener molecules, reducing the drying stress of the negative film layer, reducing warpage of the electrode plate during the drying, and reducing the risk of cracking of the negative film layer.

Moreover, during the drying of the negative electrode plate, the second plasticizer is almost completely volatilized, thereby avoiding a decline in the electrochemical performance of the secondary battery. The residue of the first plasticizer in the negative film layer can improve the performance of the electrolytic solution in infiltrating the negative electrode plate and Li' conductivity, thereby improving the cycle performance of the secondary battery that contains the negative electrode plate.

In any embodiment of this application, a weight-average molecular weight of the POSS-containing block copolymer is 10000 to 30000, and optionally 15000 to 25000. When the weight-average molecular weight of the POSS-containing block copolymer falls within the above range, the block copolymer ensures that the plasticizer molecules are evenly dispersed among the polymer binder molecules and the CMC molecules, thereby effectively reducing the strong intermolecular force of the polymer binder molecules and the CMC molecules. Therefore, the CMC molecular chain can more easily implement a conformational transition to relax, so as to reduce the stress generated by the negative film layer during the drying and reduce the probability of cracking of the negative film layer. In addition, when the weight-average molecular weight of the POSS-containing block copolymer falls within the above range, the block copolymer endows the electrode plate with high lithium-ion diffusion kinetics, prevents disruption of the intercalation and deintercalation of active lithium ions during cycling, and in turn, avoids increase of the internal resistance of the secondary battery.

In any embodiment of this application, a weight-average molecular weight of the polyester containing the —[O—CH($CH_3$)—C(═O)]— structural unit is 5000 to 15000, and optionally 7000 to 11000. When the weight-average molecular weight of the polyester containing the —[O—CH($CH_3$)—C(═O)]— structural unit falls within the above range, the polyester ensures that the plasticizer molecules are evenly dispersed among the polymer binder molecules and the CMC molecules, thereby effectively reducing the strong intermolecular force of the polymer binder molecules and the CMC molecules. Therefore, the CMC molecular chain can more easily implement a conformational transition to relax, so as to reduce the stress generated by the negative film layer during the drying and reduce the probability of cracking of the negative film layer. In addition, when the weight-average molecular weight of the polyester containing the —[O—CH($CH_3$)—C(═O)]— structural unit falls within the above range, the polyester endows the electrode plate with high lithium-ion diffusion kinetics, prevents disruption of the intercalation and deintercalation of active lithium ions during cycling, and in turn, avoids increase of the internal resistance of the secondary battery.

In any embodiment of this application, the POSS-containing block copolymer is formed by linking a POSS head group $[Y]_{p-q}$—$[SiO_{1.5}]_p$ and q polymer tail chains through a link group. In the formula above, p is an even number from 6 to 20, and optionally 6, 8, 10, or 12; 1≤q≤p, and optionally, 2≤q≤p; Y represents a non-reactive group, and optionally, the Y groups each independently represent hydrogen, halogen, or one or at least two of the following groups substituted or unsubstituted by $R^a$: $C_1$ to $C_8$ alkyl, $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclic, $C_1$ to $C_8$ aliphatic heterocyclyl, $C_6$ to $C_{10}$ aryl, and $C_2$ to $C_{10}$ heteroaryl; and $R^a$ represents at least one of halogen, hydroxyl, mercapto, carboxyl, amino, phenyl, $C_1$ to $C_8$ alkyl, $C_1$ to $C_8$ alkoxyl, $C_3$ to $C_8$ alicyclic, $C_6$ to $C_{10}$ aryl, or $C_2$ to $C_{10}$ heteroaryl; the link group represents a linking group, and is a single bond, $C_1$ to $C_8$ alkylidene, $C_1$ to $C_8$ alkyleneoxy, $C_1$ to $C_8$ alkylenethio, $C_2$ to $C_8$ alkenylene, $C_2$ to $C_8$ alkynylene, and optionally $C_1$ to $C_8$ alkylidene; and the q polymer tail chains each independently include at least one of structural units represented by Formula 1:

Formula 1

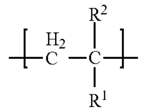

In Formula 1, $R^1$ represents —(C═O)$OR^{11}$ or —O(C═O)$R^{12}$; $R^{11}$ and $R^{12}$ each independently represent one or at least two of the following groups substituted or unsubstituted by a $R^b$ group: $C_1$ to $C_8$ alkyl, $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl, $C_1$ to $C_8$ aliphatic heterocyclyl, $C_6$ to $C_{10}$ aryl, and $C_2$ to $C_{10}$ heteroaryl; and $R^b$ represents at least one of halogen, hydroxyl, carboxyl, amino, cyano, amido, sulfonic acid group, sulfinic acid group, phenyl, $C_1$ to $C_8$ alkyl, or $C_1$ to $C_8$ alkoxyl; and $R^2$ represents at least one of hydrogen, $C_1$ to $C_8$ alkyl, $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl, $C_1$ to $C_8$ aliphatic heterocyclyl, $C_6$ to $C_{10}$ aryl, halogen, phenyl, $C_3$ to $C_8$ alicyclyl, $C_6$ to $C_{10}$ aryl, or $C_2$ to $C_{10}$ heteroaryl.

When the POSS-containing block copolymer assumes the above structure, the weight-average molecular weight of the POSS-containing block copolymer can be effectively controlled to fall within an appropriate range. In this way, it is ensured that, when applied in a negative electrode slurry, the negative electrode composition in this application can reduce the probability of cracking of the negative film layer during the drying of the electrode plate in a case of high-speed coating and thick coating. In addition, when the POSS-containing block copolymer assumes the above structure, the ester group in the polymer tail can interact with the polymer binder molecules and the CMC molecules to increase the intermolecular distance of the molecules, thereby further reducing the intermolecular strong hydrogen bonding effect of the polymer binder molecules and the CMC molecules, and in turn, releasing the stress generated during the drying and improving the flexibility of the negative film layer. Further, when the POSS-containing block copolymer assumes the above structure, the ester group included in the structure further enhances the affinity of the plasticizer for the electrolytic solution and increases Li' conductivity. Even if a residue of the plasticizer remains in the electrode plate, the residue will not impair the performance of the electrolytic solution in infiltrating the negative film layer or the kinetic performance of the secondary battery.

In any embodiment of this application, the polyester containing the —[O—CH($CH_3$)—C(═O)]— structural unit assumes a structural formula represented by Formula 2. In Formula 2, m represents an integer of 60 to 170, and optionally represents an integer of 100 to 150; $R^3$ and $R^4$ each independently represent the following group substituted or unsubstituted by $R^c$: $C_1$ to $C_8$ alkyl, $C_1$ to $C_8$ alkoxyl, $C_2$ to $C_8$ alkenyl, or $C_2$ to $C_8$ alkynyl; W represents at least one of halogen, amino, cyano, amido, hydroxyl, mercapto, $C_1$ to $C_8$ alkyl, or $C_1$ to $C_8$ alkoxyl; and M and M' each independently represent hydrogen, alkali metal, or alkaline earth metal, and optionally, both M and M' are Li.

Formula 2

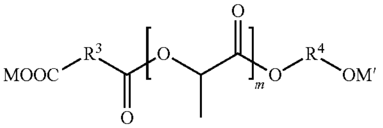

When the polyester containing the —[O—CH($CH_3$)—C(═O)]— structural unit assumes the above structure, the first plasticizer is endowed with stronger affinity for the electrolytic solution. Therefore, when applied to the negative electrode slurry, the negative electrode composition in this application can further improve the performance of the negative electrode plate in being infiltrated by the electrolytic solution and in retaining the electrolytic solution, thereby enhancing the rate performance of the secondary battery. In addition, when the polyester containing the —[O—CH($CH_3$)—C(═O)]— structural unit assumes the above structure, the ester group in a molecule of the polyester is highly electronegative, thereby improving the lithium-ion conductivity of the negative electrode plate, and in turn, further improving the cycle performance of the secondary battery. The negative electrode composition in this application includes the polyester that assumes the above structure, and can improve the performance of the negative electrode plate while reducing the cracking degree of the film layer during the drying of the negative electrode plate, thereby improving the cycle performance of the secondary battery.

In any embodiment of this application, the second plasticizer includes a dihydric alcohol with a boiling point $T_m$ of 160° C. to 250° C. Optionally, the second plasticizer includes at least one of the following compounds:

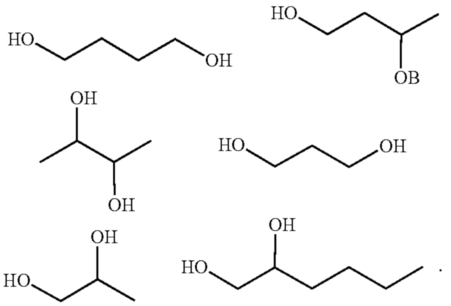

The second plasticizer is a dihydric alcohol selected from the above compounds. The hydroxyl group in a molecule of the dihydric alcohol can interact with the groups in the polymer binder and the thickener to reduce the connection points between the polymer binder molecules and the connection points between the thickener molecules, thereby replacing the interaction between the polymer binder molecules and the interaction between the thickener molecules, and weakening the strong intermolecular force of the additive. Therefore, the second plasticizer can work synergistically with the first plasticizer to reduce the degree of warpage during the drying of the electrode plate, thereby reducing the risk of cracking of the negative film layer during the drying and calendering of the electrode plate.

In any embodiment of this application, based on a total mass of the negative electrode composition, a mass percent of the plasticizer is 0.1% to 0.6%, and optionally 0.2% to 0.4%. When the mass percent of the plasticizer in the negative electrode composition falls within the above range, on the one hand, the negative electrode composition applied to the negative electrode slurry is caused to form a slurry coating that generates a relatively small stress during the drying, thereby reducing the degree of cracking of the negative film layer. On the other hand, the negative electrode plate containing the negative electrode composition of this application is highly conductive in conducting lithium ions and electrons, thereby reducing the interfacial charge transfer resistance of the negative electrode plate, and in turn, improving the rate performance and cycle performance of the secondary battery.

In any embodiment of this application, the plasticizer satisfies at least one of the following conditions:

(a) based on the total mass of the negative electrode composition, a mass percent of the second plasticizer is less than or equal to 0.3%, and optionally, is 0.05% to 0.3%, so that, when the mass percent of the second plasticizer falls within such an appropriate range, the residual amount of the second plasticizer in the negative film layer is caused to be appropriate, thereby improving the flexibility of the negative film layer, reducing the degree of cracking of the negative film layer, and also ensuring relatively high safety performance of the secondary battery; and (b) a mass ratio between the first plasticizer and the second plasticizer is 1:(0.15 to 6), and optionally 1:(0.4 to 1.5), so that, when the mass ratio between the first plasticizer and the second plasticizer falls within such a range, the degree of cracking of the negative film layer is effectively reduced, and it is ensured that the negative electrode plate achieves high performance in being infiltrated by the electrolytic solution and in retaining the electrolytic solution and high lithium-ion conductivity, thereby improving the production capacity of the secondary batteries, reducing the internal resistance of the secondary battery, and achieving relatively high rate performance and safety performance of the secondary battery.

In any embodiment of this application, the negative electrode composition further includes at least one of a conductive agent, a binder, or a thickener. When the negative electrode composition containing at least one of the above additives is applied in the negative electrode slurry, the prepared negative electrode plate achieves high conductivity and cycle stability.

A second aspect of this application provides a negative electrode slurry. The negative electrode slurry includes a solvent and the negative electrode composition according to any one of the embodiments in the first aspect of this application.

The negative electrode slurry of this application includes the corresponding ingredients of the negative electrode composition of this application. Therefore, after the negative electrode slurry is applied to a negative current collector to form a slurry coating, the slurry coating generates a relatively small drying stress during the drying. In addition, the formed negative film layer is highly flexible, thereby avoiding cracking of the negative film layer during the drying. In addition, the negative film layer formed by the negative electrode slurry of this application achieves high performance in conducting lithium ions and being infiltrated by the electrolytic solution, thereby improving the cycle performance of the secondary battery when applied to the secondary battery.

In any embodiment of this application, the negative electrode slurry satisfies at least one of the following conditions (1) to (5).

(1) The solvent is water.

(2) A solid content of the negative electrode slurry is 45% to 58%. When the solid content of the negative electrode slurry falls within an appropriate range, it is convenient to control the coating concentration and the film layer thickness of the negative electrode. In this way, the negative electrode plate achieves a relatively high energy density, thereby increasing the energy density of the secondary battery.

(3) A viscosity of the negative electrode slurry is 4000 mPa·s to 15000 mPa·s. When the viscosity of the negative electrode slurry falls within an appropriate range, the thickness of the coating formed by the negative electrode slurry on the surface of the current collector is uniform, thereby reducing the risk of cracking of the negative film layer caused by nonuniform drying stress in the coating.

(4) A solid coating concentration of the negative electrode slurry is greater than or equal to 210 mg/1540.25 $mm^2$. When the negative electrode slurry includes the negative electrode composition of this application, the drying stress of the negative film layer can be reduced, and the nonuniformity of tension caused by different drying speeds in different regions of the negative electrode plate can be alleviated, thereby reducing the degree of cracking of the negative film layer. Even under a ultra-thick coating condition that the coating concentration of the negative electrode slurry in this application is greater than or equal to 210 mg/1540.25 $mm^2$, the formed negative film layer is still not prone to crack.

(5) A coating speed of the negative electrode slurry is greater than or equal to 60 m/min. When the negative electrode slurry includes the negative electrode composition of this application, the flexibility of the formed negative film layer can be improved, thereby reducing the risk of cracking of the negative film layer. Even under a high-speed coating condition that the coating speed of the negative electrode slurry in this application is greater than or equal to 60 m/min, the formed negative film layer is still not prone to crack.

A third aspect of this application provides a negative electrode plate, including a negative current collector and a negative film layer located on at least one surface of the negative current collector. The negative film layer includes the negative electrode composition according to any one of the embodiments in the first aspect of this application or a layer formed by drying the negative electrode slurry according to any one of the embodiments in the second aspect of this application.

In the negative electrode plate of this application, the negative film layer includes the negative electrode composition of this application, or is formed by drying the negative electrode slurry of this application, and therefore, is not prone to crack and achieves high performance in being infiltrated by the electrolytic solution and in conducting lithium ions. Therefore, when applied to a secondary battery, the negative electrode plate of this application can increase the production capacity of the secondary batteries, reduce the cost of the secondary battery, and ensure high cycle performance and rate performance of the secondary battery.

In any embodiment of this application, the negative electrode plate satisfies at least one of the following conditions (6) to (9).

(6) Based on a total mass of the negative electrode plate, a mass percent of the second plasticizer is less than 100 ppm. When the mass percent of the second plasticizer falls within such a range, the second plasticizer is prevented from hindering the infiltration of the electrolytic solution and prevented from reacting parasitically with the electrolytic solution, thereby ensuring high cycle performance, rate performance, and safety performance of the secondary battery.

(7) A thickness of the negative film layer on a single side of the negative current collector is 80 μm to 120 μm. In the negative electrode plate of this application, the negative film layer is not prone to crack and achieves high performance in being infiltrated by the electrolytic solution and in retaining the electrolytic solution. When the thickness of the negative active layer falls within the above range, the negative electrode plate of this application applied to a secondary battery can also contribute to high cycle performance, rate performance, and safety performance of the secondary battery.

(8) A compacted density of the negative film layer is 1.3 g/cm 3 to 1.7 $g/cm^3$. When the compacted density of the negative film layer is controlled to fall within an appropriate range, the negative active material particles in the negative film layer can contact each other closely, thereby increasing the content of the negative active material per unit volume, and in turn, increasing the energy density of the secondary battery.

(9) A thickness of the negative current collector is less than or equal to 8 μm, and optionally, is 4 μm to 6 μm. When the thickness of the negative current collector falls within an appropriate range, the secondary battery can achieve a relatively high energy density and conductivity.

A fourth aspect of this application provides a secondary battery. The secondary battery includes the negative electrode plate according to this application.

In the negative electrode plate of the secondary battery in this application, the negative film layer includes the negative electrode composition of this application, or is formed by drying the negative electrode slurry of this application, and therefore, is not prone to crack and achieves high performance in being infiltrated by the electrolytic solution and in conducting lithium ions. Therefore, when applied to a secondary battery, the negative electrode plate of this application can increase the production capacity of the secondary batteries, reduce the cost of the secondary battery, and ensure high cycle performance and rate performance of the secondary battery.

A fifth aspect of this application provides an electrical device. The electrical device includes at least one of the secondary battery, a battery module, or a battery pack according to this application.

The electrical device according to this application contains the secondary battery according to this application, and therefore, achieves at least the same advantages as the secondary battery.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION OF EMBODIMENTS

Figure 1:
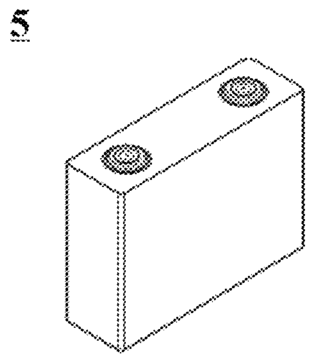
FIG. 1 is a schematic diagram of a secondary battery according to an embodiment of this application.

To make the objectives, technical solutions, and beneficial effects of this application clearer, the following describes this application in further detail with reference to embodiments. Understandably, the embodiments described in this specification are merely intended for interpreting this application but not intended to limit this application.

For brevity, just some of numerical ranges are expressly disclosed herein. However, any lower limit may be combined with any upper limit to form an unspecified range, any lower limit may be combined with any other lower limit to form an unspecified range, and any upper limit may be combined with any other upper limit to form an unspecified range. In addition, although not explicitly stated, any point and any single numerical value between end points of a range are included in the range. Therefore, each point or each single numerical value may be used as a lower limit or upper limit of the range to combine with any other point or other single numerical value or with any other lower or upper limit to form an unspecified range.

It is hereby noted that in the description herein, unless otherwise specified, a range defined by a numerical value qualified by "at least" or "at most" includes this numerical value, and the word "more" in the phrase "one or more of" means at least two.

In the description herein, unless otherwise specified, the term "or" is inclusive. For example, the expression "A or B" means "A alone, B alone, or both A and B". More specifically, any one of the following conditions satisfies the condition "A or B": A is true (or existent) and B is false (or absent); A is false (or absent) and B is true (or existent); and, both A and B are true (or existent).

It needs to be understood that the relational terms such as "first", "second" are merely used to differentiate one entity or operation from another, but do not require or imply any actual relationship or sequence between the entities or operations.

The above summary of this application is not intended to describe every disclosed embodiment or every implementation of this application. The following description exemplifies illustrative embodiments in more detail. In several places throughout this application, guidance is provided through a series of embodiments. The embodiments may be used in various combinations. In each instance, an enumerated list serves merely as a representative list, but is not to be construed as an exclusive list.

Negative Electrode Composition

As mentioned in the background section above, increasing the thickness of a negative film layer and increasing the coating speed are important approaches to improving the energy density and production capacity of the secondary batteries. However, with the increase in the thickness of the negative film layer and the coating speed, the negative film layer is prone to break apart during drying. On the basis of the existing coating process, when the coating speed is increased from 40 m/min to 60 m/min or above, the negative film layer may be cracked evidently during drying. The cracking of the negative film layer not only reduces the yield rate of the negative electrode plates, increase the production cost of the negative electrode plates, reduce the production efficiency of the negative electrode plates, but also deteriorates the interface performance of the secondary battery, impairs the rate performance and cycle performance of the secondary battery. In severe cases, the cracking may even cause lithium plating during charging of the secondary battery, and bring safety hazards to the secondary battery. Especially, when the negative electrode plate adopts a thin current collector (the thickness of the current collector is less than or equal to 6 μm) and thick coating (the coating concentration on a single side is greater than 210 mg/1540.25 $mm^2$), the cracking of the film layer is more noticeable.

During research, the applicant finds that in the prior art. In order to solve the problem of cracking of the film layer caused by high-speed coating during drying, a general practice is to add a plasticizer at a mass percent less than 5 wt % into the negative electrode slurry. Examples of the plasticizer include dimethyl sulfite, 1,3-propane sultone, N-methyl-pyrrolidone, N-methylformamide, N-methylacetamide, N,N-dimethylformamide, fluorine-containing cyclic organic ester, and polyol. Such plasticizers boils at a high boiling point (higher than 180° C.), and can easily settle as residues in the negative film layer to exert a plasticizing effect on the negative film layer, thereby alleviating the problem of cracking of the film layer during drying. However, the residues of the plasticizers exert adverse effects on the secondary batteries. For example, the residues of N-methyl-pyrrolidone corrode the negative current collector; and the polyols react parasitically with the electrolytic solution to deteriorate the performance of the battery, and in severe cases, may cause lithium plating during charging of the battery. In addition, the residues of the plasticizers in the negative film layer may make it difficult for the electrolytic solution to infiltrate, hinder electrochemical reactions in the secondary battery, lead to lithium plating on the negative electrode plate, and result in safety hazards.

Through in-depth research, the applicant hereof discloses a negative electrode composition. The negative electrode composition includes a negative active material and a plasticizer. The plasticizer includes a first plasticizer and optionally a second plasticizer. The first plasticizer includes at least one of a POSS-containing block copolymer or a polyester containing a $-[O-CH(CH_3)-C(=O)]-$ structural unit. The second plasticizer includes an organic solvent with a boiling point $T_m$ of 160° C. to 250° C.

In this application, the polyhedral oligomeric silsesquioxane (POSS) may be a cage-type polysilsesquioxane. The POSS-containing block copolymer may be a POSS cage-type polysilsesquioxane derivative compound. The polyester containing the $-[O-CH(CH_3)-C(=O)]-$ structural unit can be a product obtained by performing a polyaddition reaction on lactic acid and then esterifying the reaction product.

This application does not limit a negative active material. In some embodiments, the negative active material may be at least one selected from graphite, natural graphite, silicon, silicon-oxygen compound, silicon-carbon compound, hard carbon, MCMB, soft carbon, or tin.

The negative electrode slurry of the secondary battery is usually formed of a negative active material, a conductive agent, a thickener (such as carboxymethyl cellulose CMC) thickener, a binder (for example, made of acrylonitrile, acrylic acid, or acrylamide), and other additives mixed in a solvent. Through research, the applicant finds that the drying stress is an essential cause of cracking that occurs in a process of drying the slurry coating to form a negative film layer. Specifically, during the drying, any specified negative electrode slurry coating includes crack points, and a thickness of a crack point is referred to as a critical crack thickness. When the thickness of the negative film layer is less than or equal to the critical crack thickness, the film layer does not crack. Therefore, the greater the critical thickness, the greater the largest possible thickness of the negative film layer, and accordingly, the higher the energy density of the negative electrode plate. The critical thickness depends on physical and chemical properties of the negative electrode slurry. The properties may be described by the Triumkudulu equation shown in Equation 1. This equation is based on the classical capillary theory. A capillary force during the drying of the negative electrode slurry coating primarily depends on the drying speed and the surface tension of the solvent. The decrease in the surface tension of the slurry solvent can alleviate the cracking of the thick electrode plate. In addition, the applicant also finds that, during the drying of the negative electrode plate, the combined action of the surface tension of a curved liquid surface of the solvent, the capillary force, and the drying shrinkage of the binder (CMC, acrylonitrile, acrylic acid, and acrylamide) makes the solid particles in the negative electrode slurry come closer to each other and comp and squeeze each other. Due to the bonding between the bottom particles and the substrate, the negative film layer is fixed in a horizontal direction. The stress generated by further shrinkage of the surface of the negative film layer causes the negative electrode plate to warp. Therefore, the negative film layer at the bend in the middle region of the negative electrode plate is prone to crack due to insufficient toughness. The warped edge region of the electrode plate is flattened during calendering. In this case, cracks still occur due to insufficient toughness of the negative film layer.

$$h_{max} = 0.41\left(\frac{GM\phi_{rcp}R^3}{2\gamma}\right)^{1/2} \quad \text{Equation 1}$$

In Equation 1, $h_{max}$ represents a critical crack thickness, $\varphi_{rcp}$ represents a random close packing fraction of the solid particles in a negative electrode slurry system, R represents a radius of solid particles in the negative electrode slurry system, M represents a ligancy in a solid particle molecule in the negative electrode slurry system, G represents a shear modulus of a solid particle in the negative electrode slurry system, and y represents the surface tension of the solvent in the negative electrode slurry.

Without intending to be bound by any theory or explanation, the applicant finds that, when the first plasticizer includes a POSS-containing block copolymer, the Si—O—Si bond in the POSS can increase the flexibility of the plasticizer. Therefore, when the negative electrode composition in this application is used to form the negative film layer of the negative electrode plate, the negative electrode composition can effectively reduce the brittleness of the negative film layer, and in turn, reduce the degree of cracking of the film layer during the drying of the negative electrode plate.

In addition, the POSS-containing block copolymer includes a polar group that contains a lone electron pair. The polar group is highly hydrophilic, and can ensure high solubility of the plasticizer in water. Therefore, the plasticizer can be uniformly dispersed in the negative electrode slurry, and diffused into a molecular network of additives such as a polymer binder and a carboxymethyl cellulose (CMC) thickener, and interact with molecules in the molecular network to increase the intermolecular distance, thereby reducing the strong hydrogen bonding effect between the molecules of the additives. Therefore, during the drying, the polymer binder molecules and the CMC molecules can move sufficiently to release the stress generated during the drying and increase the flexibility of the negative film layer. Further, the polar group that contains a lone electron pair in the plasticizer endows the plasticizer with high affinity for an electrolytic solution and relatively high $Li^+$ conductivity. Even if a residue of the plasticizer remains in the electrode plate, the residue will not impair the performance of the electrolytic solution in infiltrating the negative film layer or the kinetic performance of the secondary battery.

The applicant further finds that, when the first plasticizer includes a polyester containing the —[O—CH($CH_3$)—C(=O)]— structural unit, the carbon-oxygen single bond in the polyester can endow the plasticizer with high flexibility. Therefore, when the negative electrode composition in this application is used to form the negative film layer of the negative electrode plate, the negative electrode composition can effectively reduce the brittleness of the negative film layer, and in turn, reduce the degree of cracking of the film layer during the drying of the negative electrode plate.

In addition, the polyester containing the —[O—CH($CH_3$)—C(=O)]— structural unit includes a polar ester group. The ester group can interact with the polymer binder molecules and the CMC molecules to increase the distance between such molecules, thereby reducing the strong hydrogen bonding effect between the polymer binder molecules and the CMC molecules. Therefore, during the drying, the polymer binder molecules and the CMC molecules can more easily implement a conformational transition to relax, so as to release the stress generated during the drying and increase the flexibility of the negative film layer. Further, the ester group included in the plasticizer endows the plasticizer with high affinity for the electrolytic solution and relatively high $Li^+$ conductivity. Even if a residue of the plasticizer remains in the electrode plate, the residue will not impair the performance of the electrolytic solution in infiltrating the negative film layer or the kinetic performance of the secondary battery.

Further, without intending to be bound by any theory or explanation, the applicant finds that, when the second plasticizer includes an organic solvent with a boiling point of 160° C. to 250° C., the resultant negative electrode composition applied to the negative electrode slurry can further reduce the degree of cracking of the negative film layer. Specifically, the organic solvent with a boiling point of 160° C. to 250° C. can reduce the surface tension of a water molecule in the slurry, thereby reducing the drying stress of the negative film layer, reducing the degree of warpage of the negative electrode plate during drying, and in turn, reducing the degree of cracking of the negative film layer. In addition, the organic solvent with a boiling point of 160° C. to 250° C. can almost completely volatilize during the drying of the negative electrode plate, and leave a very small amount of residues, thereby scarcely affecting the infiltration performance of the electrolytic solution of the negative electrode plate and the electrochemical performance of the secondary battery, and ensuring high kinetic performance of the secondary battery.

When applied to a negative electrode slurry, the negative electrode composition of this application can change the kinetic and thermodynamic processes of solvent volatilization during the solidification of the negative electrode slurry, thereby further reducing the degree of cracking of the negative film layer. Specifically, when the negative electrode composition of this application is applied to a negative electrode slurry, the nonuniformity of tension caused by different drying speeds in different regions of the negative electrode slurry coating can be alleviated, thereby reducing the degree of cracking of the negative film layer. In addition, the first plasticizer that remains in the electrode plate is highly flexible innately, thereby increasing the flexibility of the negative film layer and alleviating the cracking of the electrode plate during calendering. A polar functional group in the first plasticizer are also highly affinitive to the electrolytic solution and highly electronegative, and can improve the transport kinetics of $Li^+$, thereby improving the electrolyte infiltration rate and electrolyte retention performance of the negative electrode plate. When applied to a secondary battery, the negative electrode composition containing the first plasticizer reduces the infiltration time of the electrolytic solution for the negative electrode plate on the one hand, thereby reducing the manufacturing cost and improving the production capacity of the secondary batteries. On the other hand, the negative electrode composition can improve the interfacial properties of an electrode assembly and improve the kinetics and long-term cycle performance of the secondary battery. The negative electrode composition of this application is non-toxic and harmless, and remains in the negative film layer without adversely affecting the performance of the secondary battery. Applied to a negative electrode slurry, the negative electrode composition does not need to be controlled or detected in a coating process, and does not need to be recycled by any recycling equipment, thereby reducing the manufacturing cost, equipment cost, and labor cost.

In some embodiments, the plasticizer may include a combination of the first plasticizer and the second plasticizer.

After in-depth research, the applicant finds that, in contrast to the first plasticizer alone in the negative electrode composition, the combination of the first plasticizer and the second plasticizer is clearly more effective in alleviating the cracking of the negative film layer. The combined use of the first plasticizer and the second plasticizer can further effectively reduce the degree of cracking of the negative film layer in a case of high-speed coating and ultra-thick coating. Specifically, without intending to be bound by any theory or explanation, during the preparation of the slurry, the first plasticizer and the second thickener can quickly penetrate between the polymer binder molecules and the thickener molecules, thereby increasing the distance between the molecules, and in turn, reducing the strong hydrogen bonding effect between polymer binder molecules and the thickener molecules. Therefore, during the drying, the polymer binder molecules and the CMC molecules can more easily implement a conformational transition to relax, so as to release the stress generated during the drying and increase the flexibility of the negative film layer. In addition, the polar groups in the first plasticizer and the second plasticizer, such as ester group, hydroxyl, or cyano, can interact with the groups in the polymer binder molecules or thickener molecules. The polar group in the plasticizer interacts with the polymer binder molecules or the thickener molecules to reduce connection points between the polymer binder molecules or connection points between the thickener molecules, thereby replacing the original strong hydrogen bond between the polymer binder molecules or thickener molecules, and in turn, weakening the strong intermolecular force of the polymer binder molecules or thickener molecules, reducing the drying stress of the negative film layer, reducing warpage of the electrode plate during the drying, and reducing the risk of cracking of the negative film layer. Moreover, during the drying of the negative electrode plate, the second plasticizer is almost completely volatilized, thereby avoiding a decline in the electrochemical performance of the secondary battery. The residue of the first plasticizer in the negative film layer can improve the performance of the electrolytic solution in infiltrating the negative electrode plate and $Li^+$ conductivity, thereby improving the cycle performance of the secondary battery that contains the negative electrode plate.

In some embodiments, the weight-average molecular weight of the POSS-containing block copolymer may be 10000 to 30000, 10000 to 25000, 15000 to 25000, 15000 to 23000, 18000 to 23000, or 18000 to 20000.

Without intending to be bound by any theory or explanation, the applicant finds that, when the weight-average molecular weight of the POSS-containing block copolymer falls within the above range, the block copolymer ensures that the plasticizer molecules are evenly dispersed among the polymer binder molecules and the CMC molecules and interact with the polymer binder molecules and the CMC molecules to generate an appropriate distance between the polymer binder molecules and the CMC molecules. This reduces the strong intermolecular force of the polymer binder molecules and the CMC molecules. Therefore, the CMC molecular chain can more easily implement a conformational transition to relax, so as to reduce the stress generated by the negative film layer during the drying and reduce the probability of cracking of the negative film layer. In addition, when the weight-average molecular weight of the POSS-containing block copolymer falls within the above range, the block copolymer endows the electrode plate with high lithium-ion diffusion kinetics, prevents disruption of the intercalation and deintercalation of active lithium ions during cycling, and in turn, avoids increase of the internal resistance of the secondary battery.

In some embodiments, the weight-average molecular weight of the polyester containing the $—[O—CH(CH_3)—C(=O)]—$ structural unit may be 5000 to 15000, 6000 to 12000, 7000 to 11000, or 8000 to 10000.

Without intending to be bound by any theory or explanation, the applicant finds that, when the weight-average molecular weight of the polyester containing the $—[O—CH(CH_3)—C(=O)]—$ structural unit falls within the above range, the polyester ensures that the plasticizer molecules are evenly dispersed among the polymer binder molecules and the CMC molecules and interact with the polymer binder molecules and the CMC molecules to generate an appropriate distance between the polymer binder molecules and the CMC molecules. This reduces the strong intermolecular force of the polymer binder molecules and the CMC molecules. Therefore, the CMC molecular chain can more easily implement a conformational transition to relax, so as to reduce the stress generated by the negative film layer during the drying and reduce the probability of cracking of the negative film layer. In addition, when the weight-average molecular weight of the polyester containing the $—[O—CH(CH_3)—C(=O)]—$ structural unit falls within the above range, the polyester endows the electrode plate with high lithium-ion diffusion kinetics, prevents disruption of the intercalation and deintercalation of active lithium ions during cycling, and in turn, avoids increase of the internal resistance of the secondary battery.

In some embodiments, the POSS-containing block copolymer may be formed by linking a POSS head group $[Y]_{p-q}—[SiO_{1.5}]p$ and q polymer tail chains through a link group. In the formula above, p may represent an even number from 6 to 20. Specifically, p may be 6, 8, 10, 12, 14, 16, 18, or 20; and q may satisfy $1 \leq q \leq p$, and specifically $2 \leq q \leq p$.

Y may represent a non-reactive group. Among the p to q groups denoted as Y, each group Y may be identical or not. Specifically, the Y groups each may independently represent hydrogen, halogen, or one or at least two of the following groups substituted or unsubstituted by $R^a$: $C_1$ to $C_8$ alkyl (for example, methyl, ethyl, propyl, isopropyl, n-butyl, isobutyl, sec-butyl, tert-butyl, n-pentyl, or isopentyl), $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl (such as cycloalkyl), $C_1$ to $C_8$ aliphatic heterocyclyl, $C_6$ to $C_{10}$ aryl, and $C_2$ to $C_{10}$ heteroaryl; and $R^a$ may represent at least one of halogen, hydroxyl, mercapto, carboxyl, amino, phenyl, $C_1$ to $C_8$ alkyl (for example, methyl, ethyl, propyl, isopropyl, n-butyl, isobutyl, sec-butyl, tert-butyl, n-pentyl, or isopentyl), $C_1$ to $C_8$ alkoxyl, $C_3$ to $C_8$ alicyclyl, $C_6$ to $C_{10}$ aryl, or $C_2$ to $C_{10}$ heteroaryl.

The link group may represent a linking group, and may be a single bond, $C_1$ to $C_8$ alkylidene, $C_1$ to $C_8$ alkyleneoxy, $C_1$ to $C_8$ alkylenethio, $C_2$ to $C_8$ alkenylene, $C_2$ to $C_8$ alkynylene. Specifically, the link group may be $C_1$ to $C_8$ alkylidene.

Among the q polymer tail chains, each polymer tail chain may be identical or not. Specifically, the q polymer tail chains each may independently include at least one of structural units represented by Formula 1:

Formula 1

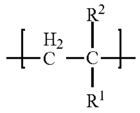

In Formula 1, $R^1$ may represent —(C═0)OR$^{11}$ or —O(C═O)R$^{12}$; $R^{11}$ and $R^{12}$ each may independently represent one or at least two of the following groups substituted or unsubstituted by a $R^b$ group: $C_1$ to $C_8$ alkyl, $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl, $C_1$ to $C_8$ aliphatic heterocyclyl, $C_6$ to $C_{10}$ aryl, and $C_2$ to $C_{10}$ heteroaryl; and $R^b$ may represent at least one of halogen, hydroxyl, carboxyl, amino, cyano, amido, sulfonic acid group, sulfinic acid group, phenyl, $C_1$ to $C_8$ alkyl, or $C_1$ to $C_8$ alkoxyl. $R^2$ may represent at least one of hydrogen, $C_1$ to $C_8$ alkyl (for example, methyl, ethyl, propyl, isopropyl, n-butyl, isobutyl, sec-butyl, tert-butyl, n-pentyl, or isopentyl), $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl, $C_1$ to $C_8$ aliphatic heterocyclyl, $C_6$ to $C_{10}$ aryl, $C_2$ to $C_{10}$ heteroaryl, halogen (F, Cl, Br, I, and the like), phenyl, $C_3$ to $C_8$ alicyclyl, $C_6$ to $C_{10}$ aryl, or $C_2$ to $C_{10}$ heteroaryl.

Without being bound by any theory or explanation, when the POSS-containing block copolymer assumes the above structure, the weight-average molecular weight of the POSS-containing block copolymer can be effectively controlled to fall within an appropriate range. In this way, it is ensured that, when applied in a negative electrode slurry, the negative electrode composition in this application can reduce the probability of cracking of the negative film layer during the drying of the electrode plate in a case of high-speed coating and thick coating. In addition, when the POSS-containing block copolymer assumes the above structure, the ester group in the polymer tail can interact with the polymer binder molecules and the CMC molecules to increase the intermolecular distance of the molecules, thereby further reducing the intermolecular strong hydrogen bonding effect of the polymer binder molecules and the CMC molecules, and in turn, releasing the stress generated during the drying and improving the flexibility of the negative film layer. Further, when the POSS-containing block copolymer assumes the above structure, the ester group included in the structure further enhances the affinity of the plasticizer for the electrolytic solution and increases Li' conductivity. Even if a residue of the plasticizer remains in the electrode plate, the residue will not impair the performance of the electrolytic solution in infiltrating the negative film layer or the kinetic performance of the secondary battery.

In some embodiments, the polyester containing the —[O—CH($CH_3$)—C(═O)]— structural unit may assume a structural formula represented by Formula 2: In Formula 2, m may represent an integer of 60 to 170, an integer of 80 to 160, or an integer of 100 to 150; $R^3$ and $R^4$ each may independently represent the following group substituted or unsubstituted by $R^c$: $C_1$ to $C_8$ alkyl, $C_1$ to $C_8$ alkoxyl, $C_2$ to $C_8$ alkenyl, or $C_2$ to $C_8$ alkynyl; W may represent at least one of halogen, amino, cyano, amido, hydroxyl, mercapto, $C_1$ to $C_8$ alkyl, or $C_1$ to $C_8$ alkoxyl; and M and M' each may independently represent hydrogen, alkali metal, or alkaline earth metal, and specifically, both M and M' are Li.

Formula 2

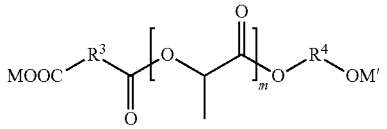

It is easy to understand that when M or M' is hydrogen, the H atom and the O atom may be linked by a covalent bond. When the element M or M' is alkali metal or alkaline earth metal, the element may be linked to —COO— by an ionic bond.

Without intending to be bound by any theory or explanation, the applicant unexpectedly finds that, when the polyester containing the —[O—CH($CH_3$)—C(═O)]— structural unit assumes the above structure, the first plasticizer is endowed with stronger affinity for the electrolytic solution. Therefore, when applied to the negative electrode slurry, the negative electrode composition in this application can further improve the performance of the negative electrode plate in being infiltrated by the electrolytic solution and in retaining the electrolytic solution, thereby enhancing the rate performance of the secondary battery. In addition, when the polyester containing the —[O—CH($CH_3$)—C(═O)]— structural unit assumes the above structure, the ester group in a molecule of the polyester is highly electronegative, thereby improving the lithium-ion conductivity of the negative electrode plate, and in turn, further improving the cycle performance of the secondary battery. The negative electrode composition in this application includes the polyester that assumes the above structure, and can improve the performance of the negative electrode plate while reducing the cracking degree of the film layer during the drying of the negative electrode plate, thereby improving the cycle performance of the secondary battery.

Further, the applicant also finds that, in contrast to the case in which M or M' contains hydrogen, when both M and M' are alkali metal or alkaline earth metal, especially when both are Li, on the one hand, this structure can prevent the carboxyl group from reacting at a low potential to transform into carboxylate and generate hydrogen, thereby avoiding the loss of active ions and the increase of gas production, and in turn, avoiding a decline in the first-cycle coulombic efficiency and the safety performance of the secondary battery; on the other hand, the alkali metal or alkaline earth metal is linked to —COO— by an ionic bond, thereby improving the lithium-ion conductivity of the negative film layer, and in turn, improving the transfer kinetics of lithium ions in the negative electrode plate, reducing the internal resistance of the secondary battery, and improving the rate performance of the secondary battery.

In some embodiments, the second plasticizer may include a dihydric alcohol with a boiling point $T_m$ of 160° C. to 250° C. Specifically, the second plasticizer may include at least one of the following compounds:

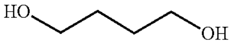
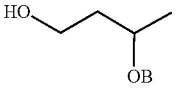
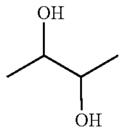
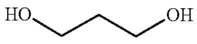
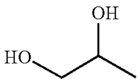
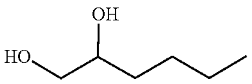
.

The second plasticizer is a dihydric alcohol selected from the above compounds. The hydroxyl group in a molecule of the dihydric alcohol can interact with the groups in the polymer binder and the thickener to reduce the connection points between the polymer binder molecules and the connection points between the thickener molecules, thereby replacing the interaction between the polymer binder molecules and the interaction between the thickener molecules, and weakening the strong intermolecular force of the additive. Therefore, the second plasticizer can work synergistically with the first plasticizer to reduce the degree of warpage during the drying of the electrode plate, thereby reducing the risk of cracking of the negative film layer during the drying and calendering of the electrode plate.

In some embodiments, based on a total mass of the negative electrode composition, a mass percent of the plasticizer may be 0.1% to 0.6%, 0.2% to 0.5%, 0.2% to 0.4%, or 0.3% to 0.4%.

Without being bound by any theory or explanation, when the mass percent of the plasticizer in the negative electrode composition falls within the above range, on the one hand, the negative electrode composition applied to the negative electrode slurry is caused to form a slurry coating that generates a relatively small stress during the drying, thereby reducing the degree of cracking of the negative film layer. On the other hand, the negative electrode plate containing the negative electrode composition of this application is highly conductive in conducting lithium ions and electrons, thereby reducing the interfacial charge transfer resistance of the negative electrode plate, and in turn, improving the rate performance and cycle performance of the secondary battery.

In some embodiments, the plasticizer may satisfy at least one of the following conditions (a) and (b).

(a) Based on the total mass of the negative electrode composition, a mass percent of the second plasticizer may be less than or equal to 0.3%. Specifically, the mass percent of the second plasticizer may be 0.03% to 0.3%, 0.05% to 0.3%, 0.08% to 0.3%, or 0.1% to 0.3%.

Without intending to be bound by any theory or explanation, the applicant finds that the added second plasticizer can significantly improve the flexibility of the negative film layer. However, the second additive is inferiorly compatible with the electrolytic solution. If the mass percent of the second additive in the negative electrode composition is excessive, it will be difficult for the electrolytic solution to infiltrate the negative film layer. Especially when the negative film layer is relatively thick, the infiltration rate of the electrolytic solution is low, thereby increasing the time cost of manufacturing the secondary battery and reducing the production capacity of the secondary batteries. To make matters worse, when the second plasticizer is selected from alcohols, the —OH in the molecule not only hinders the electrochemical reaction and results in lithium plating on the negative electrode, but also increases the gas production during the cycling of the secondary battery, thereby deteriorating the safety performance of the secondary battery severely. When the mass percent of the second plasticizer falls within such an appropriate range, the residual amount of the second plasticizer in the negative film layer is caused to be appropriate, thereby improving the flexibility of the negative film layer, reducing the degree of cracking of the negative film layer, and also ensuring relatively high safety performance of the secondary battery.

(b) A mass ratio between the first plasticizer and the second plasticizer may be 1:(0.15 to 6), 1:(0.2 to 5), 1:(0.25 to 4), 1:(0.3 to 3), 1:(0.35 to 2), or 1:(0.4 to 1.5).

Without intending to be bound by any theory or explanation, the applicant finds that the second plasticizer is more efficient than the first plasticizer in reducing the degree of cracking of the negative film layer. However, the residues of the second plasticizer that remain in the negative film layer affect the speed of infiltrating the negative film layer and hinder the electrochemical reaction, thereby reducing the production capacity, rate performance, and safety performance of the secondary battery. When the mass ratio between the first plasticizer and the second plasticizer falls within such a range, the degree of cracking of the negative film layer is effectively reduced, and it is ensured that the negative electrode plate achieves high performance in being infiltrated by the electrolytic solution and in retaining the electrolytic solution and high lithium-ion conductivity. When the mass ratio between the first plasticizer and the second plasticizer falls within such a range, the plasticizers improve the production capacity of the secondary batteries, reduce the internal resistance of the secondary battery, and contribute to achieving relatively high rate performance and safety performance of the secondary battery.

In some embodiments, the negative electrode composition further includes at least one of a conductive agent, a binder, or a thickener. Specifically, the conductive agent may be at least one selected from superconducting carbon black, acetylene black, or carbon nanotubes. The thickener may be at least one selected from sodium carboxymethyl cellulose or lithium carboxymethyl cellulose. The binder may be at least one selected from emulsion-type SBR or solution-type acrylamide/acrylonitrile. When the negative electrode composition containing at least one of the above additives is applied in the negative electrode slurry, the prepared negative electrode plate achieves high conductivity and cycle stability.

In some embodiments, based on the total mass of the negative electrode composition, the mass percent of the plasticizer may be 0.1% to 0.6%, 0.2% to 0.4%, and specifically may be 0.1%, 0.15%, 0.2%, 0.25%, 0.3%, 0.35%, 0.4%, 0.45%, 0.5%, 0.55%, or 0.6%. The mass percent of the negative active material may be 90% to 98%. The mass percent of the conductive agent may be 0.3% to 5%. The mass percent of the binder may be 0.8% to 2.5%. The mass percent of the thickener may be 0.8% to 2.5%.

Not intending to be bound by any theory or explanation, the applicant finds that, by controlling the mass percent of the plasticizer in the negative electrode composition to fall within the above range, the plasticizer can not only exert a high plasticizing effect, make the negative film layer not prone to crack, and contribute to improving the production capacity of the negative electrode plates, but also ensure that the residual amount of the plasticizer in the negative film layer is moderate, ensure a relatively high proportion of the negative active material, and achieve relatively high lithium-ion conductivity and electronic conductivity of the negative electrode plate. Therefore, when applied in a secondary battery, the negative electrode plate containing the negative electrode composition can significantly improve the energy density, rate performance, and cycle performance of the battery.

Negative Electrode Slurry

A second aspect of this application provides a negative electrode slurry. The negative electrode slurry includes a solvent and the negative electrode composition according to this application.

The negative electrode slurry of this application includes the corresponding ingredients of the negative electrode composition of this application. Therefore, after the negative electrode slurry is applied to a negative current collector to form a slurry coating, the slurry coating generates a relatively small drying stress during the drying. In addition, the formed negative film layer is highly flexible, thereby avoiding cracking of the negative film layer during the drying. In addition, the negative film layer formed by the negative electrode slurry of this application achieves high performance in conducting lithium ions and being infiltrated by the electrolytic solution, thereby improving the cycle performance of the secondary battery when applied to the secondary battery.

In some embodiments, the negative electrode slurry may satisfy at least one of the following conditions (1) to (5).

(1) The solvent may be water. Specifically, the solvent may be deionized water.

(2) A solid content of the negative electrode slurry may be 45% to 58%. When the solid content of the negative electrode slurry falls within an appropriate range, it is convenient to control the coating concentration and the film layer thickness of the negative electrode. In this way, the negative electrode plate achieves a relatively high energy density, thereby increasing the energy density of the secondary battery.

(3) A viscosity of the negative electrode slurry may be 4000 mPa·s to 15000 mPa·s. When the viscosity of the negative electrode slurry falls within an appropriate range, the thickness of the coating formed by the negative electrode slurry on the surface of the current collector is uniform, thereby reducing the risk of cracking of the negative film layer caused by nonuniform drying stress in the coating.

(4) A solid coating concentration of the negative electrode slurry may be greater than or equal to 210 mg/1540.25 $mm^2$. When the negative electrode slurry includes the negative electrode composition of this application, the drying stress of the negative film layer can be reduced, and the nonuniformity of tension caused by different drying speeds in different regions of the negative electrode plate can be alleviated, thereby reducing the degree of cracking of the negative film layer. Even under a ultra-thick coating condition that the coating concentration of the negative electrode slurry in this application is greater than or equal to 210 mg/1540.25 $mm^2$, the formed negative film layer is still not prone to crack.

(5) A coating speed of the negative electrode slurry may be greater than or equal to 60 m/min. When the negative electrode slurry includes the negative electrode composition of this application, the flexibility of the formed negative film layer can be improved, thereby reducing the risk of cracking of the negative film layer. Even under a high-speed coating condition that the coating speed of the negative electrode slurry in this application is greater than or equal to 60 m/min, the formed negative film layer is still not prone to crack.

Method for Preparing a Negative Electrode Slurry

This application further provides a method for preparing a negative electrode slurry of this application. The method includes: mixing well a solvent with a negative electrode material that includes the negative electrode composition of this application to obtain a negative electrode slurry.

In some embodiments, the solvent may be water. Specifically, the solvent may be deionized water.

In some embodiments, a solid content of the negative electrode slurry may be 45% to 58%. When the solid content of the negative electrode slurry falls within an appropriate range, it is convenient to control the coating concentration and the film layer thickness of the negative electrode. In this way, the negative electrode plate achieves a relatively high energy density, thereby increasing the energy density of the secondary battery.

In some embodiments, a viscosity of the negative electrode slurry may be 4000 mPa·s to 15000 mPa·s. When the viscosity of the negative electrode slurry falls within an appropriate range, the thickness of the coating formed by the negative electrode slurry on the surface of the current collector is uniform, thereby reducing the risk of cracking of the negative film layer caused by nonuniform drying stress in the coating.

In some embodiments, a solid coating concentration of the negative electrode slurry is greater than or equal to 210 mg/1540.25 $mm^2$. When the negative electrode slurry includes the negative electrode composition of this application, the drying stress of the negative film layer can be reduced, and the nonuniformity of tension caused by different drying speeds in different regions of the negative electrode plate can be alleviated, thereby reducing the degree of cracking of the negative film layer. Even under a ultra-thick coating condition that the coating concentration of the negative electrode slurry in this application is greater than or equal to 210 mg/1540.25 $mm^2$, the formed negative film layer is still not prone to crack.

In some embodiments, a coating speed of the negative electrode slurry may be greater than or equal to 60 m/min. When the negative electrode slurry includes the negative electrode composition of this application, the flexibility of the formed negative film layer can be improved, thereby reducing the risk of cracking of the negative film layer. Even under a high-speed coating condition that the coating speed of the negative electrode slurry in this application is greater than or equal to 60 m/min, the formed negative film layer is still not prone to crack.

Negative Electrode Plate

A third aspect of this application provides a negative electrode plate. The negative electrode plate includes a negative current collector and a negative film layer located on at least one surface of the negative current collector. The negative film layer includes the negative electrode composition of this application, or the negative film layer is a layer formed by drying the negative electrode slurry of this application.

In the secondary battery of this application, the negative current collector may be a metal foil or a composite current collector (formed by disposing a metal material on a polymer substrate). As an example, the negative current collector may be a copper foil.

In the secondary battery of this application, the negative film layer may be disposed on one side of the negative current collector or both sides of the negative current collector. For example, the negative current collector includes two sides opposite to each other in a thickness direction of the current collector. The negative film layer is disposed on either or both of the two opposite sides of the negative current collector.

In the negative electrode plate of this application, the negative film layer includes the negative electrode composition of this application, or is formed by drying the negative electrode slurry of this application, and therefore, is not prone to crack and achieves high performance in being infiltrated by the electrolytic solution and in conducting lithium ions. Therefore, when applied to a secondary battery, the negative electrode plate of this application can increase the production capacity of the secondary batteries, reduce the cost of the secondary battery, and ensure high cycle performance and rate performance of the secondary battery.

In some embodiments, the negative electrode plate may satisfy at least one of the following conditions (6) to (9).

(6) Based on a total mass of the negative electrode plate, a mass percent of the second plasticizer may be less than 100 ppm. When the mass percent of the second plasticizer falls within the above appropriate range, the second plasticizer is prevented from hindering the infiltration of the electrolytic solution and prevented from reacting parasitically with the electrolytic solution, thereby ensuring high cycle performance, rate performance, and safety performance of the secondary battery.

(7) A thickness of the negative film layer on a single side of the negative current collector may be 80 μm to 120 μm. When the thickness of the negative film layer falls within the above range, the negative film layer can increase the energy density of the negative electrode plate, thereby increasing the energy density of the secondary battery. In the negative electrode plate of this application, the negative film layer is not prone to crack and achieves high performance in being infiltrated by the electrolytic solution and in retaining the electrolytic solution. When the thickness of the negative active layer falls within the above range, the negative electrode plate of this application applied to a secondary battery can also contribute to high cycle performance, rate performance, and safety performance of the secondary battery.

(8) A compacted density of the negative film layer may be 1.3 $g/cm^3$ to 1.7 $g/cm^3$. When the compacted density of the negative film layer is controlled to fall within an appropriate range, the negative active material particles in the negative film layer can contact each other closely, thereby increasing the content of the negative active material per unit volume, and in turn, increasing the energy density of the secondary battery.

(9) A thickness of the negative current collector may be less than or equal to 8 μm. Specifically, the thickness of the negative current collector may be 4 μm to 6 μm. When the thickness of the negative current collector falls within an appropriate range, the secondary battery can achieve a relatively high energy density and conductivity.

It is hereby noted that the parameter ranges of the negative film layer (such as film thickness and compacted density) specified herein mean the parameter ranges of a single-side film layer. When the negative film layer is disposed on both sides of the negative current collector, the parameter settings are considered to fall within the protection scope of this application as long as the parameters of any one side of the negative film layer satisfy the ranges specified herein. The film thickness, compacted density, and other parameters of the film layer mentioned in this application mean the parameters of a film layer compacted by cold pressing and ready for use in a battery to be assembled.

In addition, in the secondary battery according to this application, the negative electrode plate does not exclude other additional functional layers other than the negative film layer. For example, in some embodiments, the negative electrode plate according to this application may further include a conductive undercoat (for example, formed of a conductive agent and a binder) disposed between the negative current collector and the negative film layer. In other embodiments, the negative electrode plate according to this application further includes a protection layer overlaying the surface of the first negative film layer.

In this application, the thickness of the negative film layer bears a meaning well known in the art, and may be measured by a method known in the art, for example, by using a high-precision micrometer (such as a Mitutoyo 293-100 micrometer accurate to within 0.1 μm).

In this application, the compacted density of the negative film layer bears a meaning well known in the art, and may be measured by a method known in the art. Compacted density of the negative film layer=areal density of the negative film layer/thickness of the negative film layer. In the formula above, the areal density of the negative film layer bears a meaning well known in the art, and may be measured by a method known in the art. An exemplary measurement method includes: taking a cold-pressed negative electrode plate coated on a single side, die-cutting the electrode plate into specimens of small discs, where the area of each disc is $S_1$; weighing a specimen, and recording the weight as $M_1$; die-cutting the uncoated negative current collector into specimens of small discs, where the area of each disc is $S_1$; and weighing a specimen of the negative current collector, and recording the weight as $M_0$; and calculating the areal density of the negative film layer as: areal density=$(M_1-M_0)/S_1$, or, if the negative electrode plate is coated on both sides, calculating the areal density as: areal density=$(M_1-M_0)/2S_1$, where $M_1$ is the weight of the negative electrode plate, and $M_0$ is the weight of the negative current collector.

It is hereby noted that the above parameter tests for the negative film layer or the negative active material may be sampled and tested during preparation of the battery, or may be sampled and tested among the prepared secondary batteries.

As an example, when the specimen is taken from a prepared secondary battery, the sampling may be performed according to the following steps S10 to S30:

S10. Discharging the secondary battery (for safety reasons, the battery is generally caused to be in a fully discharged state); disassembling the battery and taking out a negative electrode plate; soaking the negative electrode plate in dimethyl carbonate (DMC) for a period (for example, 2 to 10 hours); and then taking out the negative electrode plate, drying the negative electrode plate at a specified temperature for a specified time (for example, at 60° C. for 4 hours), and taking out the dried negative electrode plate. At this time, specimens may be taken from the dried negative electrode plate to test various parameters related to the negative film layer of this application.

S20. Baking, at a specified temperature for a specified time (for example, at 400° C. for 2 hours), the negative electrode plate dried in step S10; selecting a region on the baked negative electrode plate randomly, and taking specimens of the negative active material (for example, by scraping powder with a scraper).

S30. Sieving the negative active material collected in step S20 (for example, through a 200-mesh sieve) to finally obtain specimens available for testing the parameters of the negative active material of this application.

Secondary Battery

A secondary battery, also known as a rechargeable battery or storage battery, is a battery that is reusable after an active material in the battery is activated by charging the battery that has been discharged.

Generally, a secondary battery includes a positive electrode plate, a negative electrode plate, a separator, and an electrolyte. During charge and discharge of the battery, active ions (such as lithium ions) are shuttled between the positive electrode plate and the negative electrode plate by intercalation and deintercalation. Disposed between the positive electrode plate and the negative electrode plate, the separator primarily serves to prevent a short circuit between the positive electrode plate and the negative electrode plate while allowing passage of ions. The electrolyte primarily serves to conduct the active ions between the positive electrode plate and the negative electrode plate.

[Negative Electrode Plate]

The secondary battery includes the negative electrode plate according to the third aspect of this application.

[Positive Electrode Plate]

In the secondary battery according to this application, the positive electrode plate includes a positive current collector and a positive film layer disposed on at least one surface of the positive current collector and containing a positive active material. For example, the positive current collector includes two surfaces opposite to each other in a thickness direction thereof. The positive film layer is disposed on either or both of the two opposite surfaces of the positive current collector.

In the secondary battery according to this application, the positive active material may be a well-known positive active material for use in a secondary battery in the art. As an example, the positive active material may include one or more of lithium transition metal oxide, olivine-structured lithium-containing phosphate, or a modified compound thereof. Examples of the lithium transition metal oxide may include but not limited to one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, or a modified compound thereof. Examples of the olivine-structured lithium-containing phosphate include, but are not limited to, one or more of lithium iron phosphate, a composite of lithium iron phosphate and carbon, lithium manganese phosphate, a composite of lithium manganese phosphate and carbon, lithium manganese iron phosphate, or a composite of lithium manganese iron phosphate and carbon, or a modified compound thereof. This application is not limited to such materials, and other conventional materials well known for use as a positive active material of a secondary battery may be used instead.

In the secondary battery according to this application, the positive film layer generally includes a positive active material, and optionally a binder, and optionally a conductive agent; and is generally formed by applying a positive electrode slurry onto a substrate and then drying and cold-pressing the slurry. The positive electrode slurry is generally formed by dispersing the positive active material, and optionally a conductive agent, and optionally a binder, and other additives into a solvent and then stirring well. The solvent may be N-methyl-pyrrolidone (NMP).

As an example, the binder for use in the positive film layer may include one or more of polyvinylidene difluoride (PVDF) or polytetrafluoroethylene (PTFE).

As an example, the conductive agent for use in the positive film layer may include one or more of superconductive carbon, carbon black (such as acetylene black and Ketjen black), carbon dots, carbon nanotubes, graphene, or carbon nanofibers.

In the secondary battery of this application, the positive current collector may be a metal foil or a composite current collector (formed by disposing a metal material on a polymer substrate). As an example, the positive current collector may be an aluminum foil.

[Electrolyte]

The type of the electrolyte for the secondary battery is not particularly limited in this application, and may be selected as required. For example, the electrolyte may be at least one selected from a solid-state electrolyte or a liquid-state electrolyte (that is, electrolytic solution).

In some embodiments, the electrolyte is an electrolytic solution. The electrolytic solution includes an electrolyte salt and a solvent.

In some embodiments, the electrolyte salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluoro(oxalato) borate), LiBOB (lithium bis(oxalato) borate), $LiPO2F_2$ (lithium difluorophosphate), LiDFOP (lithium difluoro(bisoxalato) phosphate), and LiTFOP (lithium tetrafluoro(oxalato) phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl) ethane (ESE).

In some embodiments, the electrolytic solution further optionally includes an additive. For example, the additive may include a negative film-forming additive, a positive film-forming additive, and additives that can improve some performance of the battery, for example, an additive that improves overcharge performance of the battery, an additive that improves high-temperature performance of the battery, and an additive that improves low-temperature performance of the battery, and the like.

[Separator]

Secondary batteries that employ an electrolytic solution and some secondary batteries that employ a solid-state electrolyte further contain a separator. The separator is disposed between the positive electrode plate and the negative electrode plate to serve an isolation purpose. The type of the separator is not particularly limited in this application, and may be any well-known porous separator that is highly stable both chemically and mechanically. In some embodiments, the material of the separator may be one or more selected from glass fiber, non-woven fabric, polyethylene, polypropylene, or polyvinylidene difluoride. The separator may be a single-layer film or a multilayer composite film. When the separator is a multilayer composite film, materials of different layers may be identical or different.

In some embodiments, the positive electrode plate, the negative electrode plate, and the separator may be made into an electrode assembly by winding or stacking.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The material of the soft package may be plastic such as one or more of polypropylene (PP), polybutylene terephthalate (PBT), or polybutylene succinate (PBS).

The shape of the secondary battery is not particularly limited in this application, and may be cylindrical, prismatic or any other shape. FIG. 1 shows a prismatic secondary battery 5 as an example.

Figure 2:
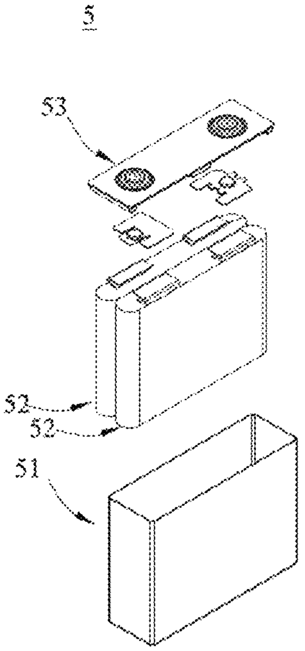
FIG. 2 is a schematic exploded view of a secondary battery according to an embodiment of this application.

In some embodiments, referring to FIG. 2, the outer package may include a housing 51 and a cover plate 53. The housing 51 may include a bottom plate and a side plate connected to the bottom plate. The bottom plate and the side plate close in to form an accommodation cavity. The housing 51 is equipped with an opening that communicates with the accommodation cavity. The cover plate 53 is configured to fit and cover the opening to close the accommodation cavity. The positive electrode plate, the negative electrode plate, and the separator may be made into the electrode assembly 52 by winding or stacking. The electrode assembly 52 is packaged in the accommodation cavity. The electrolytic solution infiltrates in the electrode assembly 52. The number of electrode assemblies 52 in the secondary battery 5 may be one or more, and is adjustable as required.

Electrical Device

This application further provides an electrical device. The electrical device includes the secondary battery according to this application. The secondary battery may be used as a power supply of the electrical device, or used as an energy storage unit of the electrical device. The electrical device may be, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

Figure 3:
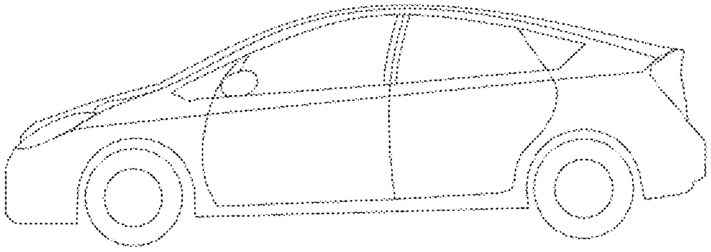
FIG. 3 is a schematic diagram of a device that uses a secondary battery of this application as a power supply according to an embodiment of this application.

FIG. 3 shows an electrical device as an example. The electrical device may be a battery electric vehicle, a hybrid electric vehicle, a plug-in hybrid electric vehicle, or the like. A battery pack or a battery module containing the secondary battery according to this application may be employed to meet the requirements of the device for a high power and a high energy density.

In another example, the electrical device may be a mobile phone, a tablet computer, a notebook computer, or the like. The electrical device is generally required to be thin and light, and may employ a secondary battery as a power supply.

EMBODIMENTS

The following embodiments are more detailed descriptions of the subject-matter disclosed herein. The embodiments are merely intended as illustrative descriptions because, evidently, a person skilled in the art may make various modifications and changes to such embodiments without departing from what is disclosed herein. Unless otherwise specified, all fractions, percentages, and ratios mentioned in the following embodiments are values by weight. All reagents used in the embodiments are commercially available or can be synthesized according to conventional methods, and can be directly put into use without a need of further processing. All the instruments used in the embodiments are commercially available.

Embodiments 1 to 34

Preparing a Negative Electrode Slurry

Adding a plasticizer into deionized water, adjusting the content of the plasticizer, and stirring well to obtain a first dispersion. Mixing well the first dispersion, graphite as a negative active material, conductive carbon, a thickener CMC, and a binder SBR to obtain a negative electrode slurry.

The mass ratio between the graphite as a negative active material, the conductive carbon, the thickener CMC, and the binder SBR is 96.6:0.7:1:1.5. Based on the total mass of the solid ingredients in the negative electrode slurry, the mass percent of the plasticizer is w. The plasticizer includes a first plasticizer and optionally a second plasticizer. The mass ratio between the first plasticizer and the second plasticizer is denoted as a. In the first plasticizer, the POSS-containing block copolymer is denoted as plasticizer A, and the polyester containing the —[O—CH($CH_3$)—C(═O)]— structural unit is denoted as plasticizer B.

The type, mass percent w, and other preparation parameters of the plasticizers used in each embodiment are shown in Table 1.

Comparative Embodiment 1

Preparing a Negative Electrode Slurry

Adding graphite as a negative active material, conductive carbon, a thickener CMC, and a binder SBR at a mass ratio of 96.8:0.7:1:1.5 into deionized water, and mixing well to obtain a negative electrode slurry.

Comparative Embodiments 2 to 11

Preparing the positive electrode materials of Comparative Embodiments 2 to 11 based on the preparation process of the negative electrode slurry in Embodiment 1 by adjusting the type, content w, and other preparation parameters of the plasticizers as shown in Table 1.

Performing the following steps to test the liquid surface tension of the first dispersions in Embodiments 1 to 34 and Comparative Embodiments 2 to 11, and the deionized water in Comparative Embodiment 1 to obtain test results shown in Table 1.

Testing the Liquid Surface Tension

Testing the liquid surface tension with an interfacial tensiometer (model: DCAT 15) according to the following test process:

Touching the liquid surface by using a 24 mm×10 mm×0.1 mm platinum sheet with a sandblasted and roughened surface. When the instrument senses immersion of the platinum sheet into the liquid under test, the surroundings of the platinum plate are subjected to a surface tension, and the surface tension of the liquid pulls the platinum sheet down as far as practicable. When the surface tension of the liquid and other related forces and balance forces reach an equilibrium, the sensing platinum sheet will stop being further immersed into the liquid. At this time, the balance sensor of the instrument measures the depth of immersion and converts the depth into a surface tension value of the liquid.

TABLE 1

| Serial number | w | α | First plasticizer | Second plasticizer | Liquid surface tension |
|---|---|---|---|---|---|
| Embodiment 1 | 0.35 wt % | 20/15 | Plasticizer A | 1,3-butylene glycol | 38.95 mN/m |
| Embodiment 2 | 0.35 wt % | 20/15 | | 1,4-butylene glycol | 39.06 mN/m |
| Embodiment 3 | 0.35 wt % | 20/15 | | 2,3-butylene glycol | 39.23 mN/m |
| Embodiment 4 | 0.35 wt % | 20/15 | | 1,2-propylene glycol | 38.72 mN/m |
| Embodiment 5 | 0.35 wt % | 20/15 | | 1,3-propylene glycol | 39.03 mN/m |
| Embodiment 6 | 0.35 wt % | 20/15 | | 1,2-hexylene glycol | 39.85 mN/m |
| Embodiment 7 | 0.35 wt % | 20/15 | Plasticizer B | 1,3-butylene glycol | 40.60 mN/m |
| Embodiment 8 | 0.35 wt % | 20/15 | | 1,4-butylene glycol | 40.75 mN/m |
| Embodiment 9 | 0.35 wt % | 20/15 | | 2,3-butylene glycol | 41.20 mN/m |
| Embodiment 10 | 0.35 wt % | 20/15 | | 1,2-propylene glycol | 40.12 mN/m |
| Embodiment 11 | 0.35 wt % | 20/15 | | 1,3-propylene glycol | 40.30 mN/m |
| Embodiment 12 | 0.35 wt % | 20/15 | | 1,2-hexylene glycol | 41.35 mN/m |
| Embodiment 13 | 0.35 wt % | 20/15 | Plasticizers | 1,3-butylene glycol | 40.02 mN/m |
| Embodiment 14 | 0.35 wt % | 20/15 | A + B | 1,4-butylene glycol | 40.25 mN/m |
| Embodiment 15 | 0.35 wt % | 20/15 | | 2,3-butylene glycol | 40.67 mN/m |
| Embodiment 16 | 0.35 wt % | 20/15 | | 1,2-propylene glycol | 40.53 mN/m |
| Embodiment 17 | 0.35 wt % | 20/15 | | 1,3-propylene glycol | 40.97 mN/m |
| Embodiment 18 | 0.35 wt % | 20/15 | | 1,2-hexylene glycol | 41.15 mN/m |
| Embodiment 19 | 0.1 wt % | 20/15 | Plasticizer A | 1,3-butylene glycol | 56.25 mN/m |
| Embodiment 20 | 0.2 wt % | 20/15 | | 1,3-butylene glycol | 47.95 mN/m |
| Embodiment 21 | 0.4 wt % | 20/15 | | 1,3-butylene glycol | 46.80 mN/m |
| Embodiment 22 | 0.6 wt % | 20/15 | | 1,3-butylene glycol | 45.66 mN/m |
| Embodiment 23 | 0.1 wt % | 20/15 | Plasticizer B | 1,3-butylene glycol | 57.34 mN/m |
| Embodiment 24 | 0.2 wt % | 20/15 | | 1,3-butylene glycol | 48.32 mN/m |
| Embodiment 25 | 0.4 wt % | 20/15 | | 1,3-butylene glycol | 47.13 mN/m |
| Embodiment 26 | 0.6 wt % | 20/15 | | 1,3-butylene glycol | 46.23 mN/m |
| Embodiment 27 | 0.35 wt % | — | Plasticizer A | — | 47.19 mN/m |
| Embodiment 28 | 0.35 wt % | 5/30 | | 1,3-butylene glycol | 39.33 mN/m |
| Embodiment 29 | 0.35 wt % | 10/25 | | 1,3-butylene glycol | 39.18 mN/m |
| Embodiment 30 | 0.25 wt % | 30/5 | | 1,3-butylene glycol | 38.88 mN/m |
| Embodiment 31 | 0.35 wt % | — | Plasticizer B | — | 48.56 mN/m |
| Embodiment 32 | 0.35 wt % | 5/30 | | 1,3-butylene glycol | 40.89 mN/m |
| Embodiment 33 | 0.35 wt % | 10/25 | | 1,3-butylene glycol | 40.73 mN/m |
| Embodiment 34 | 0.25 wt % | 30/5 | | 1,3-butylene glycol | 40.43 mN/m |
| Comparative Embodiment 1 | 0 | — | — | — | 72.23 mN/m |
| Comparative Embodiment 2 | 0.35 wt % | — | — | 1,3-butylene glycol | 48.52 mN/m |
| Comparative Embodiment 3 | 0.35 wt % | — | — | 1,4-butylene glycol | 48.46 mN/m |
| Comparative Embodiment 4 | 0.35 wt % | — | — | 2,3-butylene glycol | 48.62 mN/m |
| Comparative Embodiment 5 | 0.35 wt % | — | — | 1,2-propylene glycol | 48.23 mN/m |
| Comparative Embodiment 6 | 0.35 wt % | — | — | 1,3-propylene glycol | 48.16 mN/m |
| Comparative Embodiment 7 | 0.35 wt % | — | — | 1,2-hexylene glycol | 48.02 mN/m |
| Comparative Embodiment 8 | 0.1 wt % | — | — | 1,3-butylene glycol | 56.52 mN/m |
| Comparative Embodiment 9 | 0.2 wt % | — | — | 1,3-butylene glycol | 48.20 mN/m |
| Comparative Embodiment 10 | 0.4 wt % | — | — | 1,3-butylene glycol | 47.35 mN/m |
| Comparative Embodiment 11 | 0.6 wt % | — | — | 1,3-butylene glycol | 46.43 mN/m |

A negative electrode plate is prepared by using the negative electrode slurries of Embodiments 1 to 34 and Comparative Embodiments 1 to 11 according to the following process.

Preparing a Negative Electrode Plate

Coating a copper foil evenly with the negative electrode slurry at a speed of 40 m/min and 60 m/min respectively in an amount of 210 to 240 mg/1540.25 $mm^2$ on a single side. Performing oven drying and cold pressing, and observing the cracking status of the film layer of the negative electrode plate. Slitting the foil to obtain a negative electrode plate with a compacted density controlled to be 1.65 $g/cm^3$.

The preparation parameters of the negative electrode plate and the cracking status of the film layer in each embodiment and comparative embodiment are shown in Table 2.

In addition, according to the following processes, secondary batteries are prepared from the negative electrode plates manufactured by using the negative electrode slurries in Embodiments 1 to 34 and Comparative Embodiments 1 to 11 separately and are subjected to a performance test. The test results are shown in Table 3 below.

Preparing a Secondary Battery

Preparing a Negative Electrode Plate

Using the negative electrode plate prepared from the negative electrode slurries in Embodiments 1 to 34 and Comparative Embodiments 1 to 11 as the negative electrode plate of the secondary battery directly.

Preparing a Positive Electrode Plate

Mixing well $LiNi_{0.8}Co_{0.1}Mn_{0.1}O_2$ (NCM811) as a positive active material, Super P as a conductive agent, polyvinylidene difluoride (PVDF) as a binder, and a dispersant at a mass ratio of 96.94:1.7:0.3:1:0.06 in an appropriate amount of N-methyl-pyrrolidone (NMP) solvent to form a uniform positive electrode slurry. Coating a surface of a positive current collector aluminum foil with the positive electrode slurry, and drying and cold-pressing the foil to obtain a positive electrode plate. The compacted density of the positive film layer is 3.45 g/cm$^3$, and a ratio of the negative electrode capacity per unit area to the positive electrode capacity per unit area (N/P ratio value) is controlled to be 1.07.

Preparing an Electrolytic Solution

Mixing propylene carbonate (PC), ethylene carbonate (EC), and diethyl carbonate (DEC) at a mass ratio of 1:1:1 in a dry argon atmosphere glovebox (in which the content of $H_2O$ is less than 0.1 ppm, and the content of 02 is less than 0.1 ppm) to form an organic solvent. Dissolving a well-dried lithium salt $LiPF_6$ in the organic solvent. Stirring well to obtain an electrolytic solution in which the concentration of the lithium salt is 1.15 mol/L.

Separator

Using a polypropylene film as a separator.

Preparing a Secondary Battery

Stacking the positive electrode plate, the separator, and the negative electrode plate sequentially, and winding the stacked structure to obtain an electrode assembly. Placing the electrode assembly into an outer package, injecting the electrolytic solution, and performing steps such as sealing, standing, chemical formation, and aging to obtain a secondary battery.

Performance Test

1) Testing the Cycle Capacity Retention Rate of the Battery Cycled Under 25° C.

Charging a secondary battery at a constant current of ⅓ C under a 25° C. temperature until the voltage reaches 4.2 V, and then charging the battery at a constant voltage of 4.2 V until the current reaches 0.05 C. Leaving the battery to stand for 5 minutes, and then discharging the battery at a current of ⅓ C until the voltage reaches 2.8 V. Recording the capacity at this time as an initial capacity $C_0$. Repeating the foregoing steps for the same battery, and recording the discharge capacity $C_0$ of the battery at the end of the n$^{th}$ cycle. Calculating the capacity retention rate of the battery at the end of each cycle as: $P_n=C_n/C_0\times100\%$.

Figure 4:
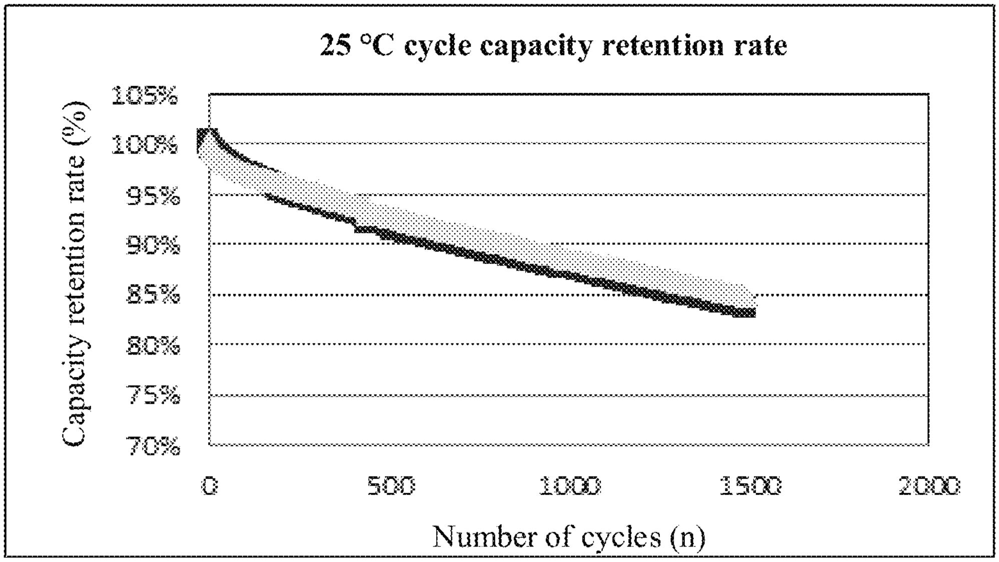
FIG. 4 is a test diagram of a cycle capacity retention rate of a battery cycled under 25° C. according to Embodiment 1 versus Comparative Embodiment 1 of this application.

FIG. 4 shows the test results of the cycle capacity retention rate of the battery cycled under 25° C. according to Embodiment 1 versus Comparative Embodiment 1.

2) Testing the Discharge Direct Current Resistance (DCR) of a 50% SOC Battery

Charging a secondary battery at a constant current rate of ⅓ C under 25° C. until a voltage of 4.2 V, and then charging the battery at a constant voltage of 4.2 V until the current reaches 0.05 C. Leaving the battery to stand for 5 minutes. Subsequently, discharging the battery at a rate of ⅓ C for 90 minutes, adjusting the state of charge of the electrode assembly to 50% SOC, leaving the battery to stand for 60 minutes, and then discharging the battery at a current of 3 C for 30 seconds, and obtaining the discharge DCR of the 50% SOC battery based on the test data.

3) Testing the 5 C Capacity Retention Rate

Charging a secondary battery at a constant current rate of 0.5 C under 25° C. until the voltage reaches 4.2 V, and then charging the battery at a constant voltage of 4.2 V until the current reaches 0.05 C. Leaving the battery to stand for 5 minutes, and then discharging the battery at a rate of 0.5 C until the voltage reaches 2.8 V, and recording the capacity as $C_0$. Charging the battery at a constant current rate of 5 C until the voltage reaches 4.2 V, and then charging the battery at a constant voltage of 4.2 V until the current reaches 0.05 C. Leaving the battery to stand for 5 minutes, and then discharging the battery at a 5 C rate until the voltage reaches 2.8 V, and recording the capacity at this time as $C_1$. Calculating the 5 C capacity retention rate as $\eta=C_1/C_0\times100\%$.

4) Testing the First-Cycle Coulombic Efficiency

Discharging a chemically formed secondary battery at constant current rate (DC) of ⅓ C under 25° C. until the voltage reaches 2.8 V. Leaving the battery to stand for 10 minutes, and then charging the battery at a constant current (CC) rate of ⅓ C until the voltage reaches 4.2 V. Subsequently, charging the battery at a constant voltage (CV) of 4.2 V until the current reaches 0.05 C, and leaving the battery to stand for 10 minutes, and recording the charge capacity at this time. Subsequently, discharging the battery at constant current (DC) rate of ⅓ C until the voltage reaches 2.8 V, and recording the discharge capacity at this time.

First-cycle coulombic efficiency=discharge capacity/charge capacity×100%.

5) Testing the Lithium Plating Status on an Interface of a Fully Charged Battery Performing chemical formation on a secondary battery (the chemical formation process may be: leaving the battery to stand for 20 minutes, charging the battery at a constant current of 0.02 C until the voltage reaches 3.0 V, leaving the battery to stand for 5 minutes, and charging the battery at a constant current of 0.05 C until the voltage reaches 3.4 V. Leaving the battery to stand for 5 minutes, and then charging the battery at a constant current of 0.2 C until the voltage reaches 3.75 V), and leaving the battery to stand for 30 minutes, and then charging the secondary batter to a full capacity (the process of fully charging the battery may be: charging the battery at a constant current rate of 0.33 C until the voltage reaches 4.2 V, and then charging the battery at a constant voltage until the current reaches 0.05 C). Disassembling the secondary battery in a dry room (with a humidity less than 0.2%). If the surface of the negative electrode is golden yellow, it indicates that no lithium plating occurs. If the surface of the negative electrode is silvery white in partial regions, it indicates that lithium plating has occurred.

TABLE 2

| Serial number | Coating concentration (mg/1540.25 $mm^2$) | Cracking status of film layer at a coating speed of 40 m/min | Cracking status of film layer at a coating speed of 60 m/min |
|---|---|---|---|
| Embodiment 1 | 240 | No crack | No crack |
| Embodiment 2 | 240 | No crack | No crack |
| Embodiment 3 | 240 | No crack | No crack |
| Embodiment 4 | 240 | No crack | No crack |
| Embodiment 5 | 240 | No crack | No crack |
| Embodiment 6 | 240 | No crack | No crack |
| Embodiment 7 | 240 | No crack | No crack |
| Embodiment 8 | 240 | No crack | No crack |
| Embodiment 9 | 240 | No crack | No crack |
| Embodiment 10 | 240 | No crack | No crack |
| Embodiment 11 | 240 | No crack | No crack |
| Embodiment 12 | 240 | No crack | No crack |
| Embodiment 13 | 240 | No crack | No crack |
| Embodiment 14 | 240 | No crack | No crack |
| Embodiment 15 | 240 | No crack | No crack |
| Embodiment 16 | 240 | No crack | No crack |
| Embodiment 17 | 240 | No crack | No crack |
| Embodiment 18 | 240 | No crack | No crack |
| Embodiment 19 | 240 | No crack | Slightly cracked |
| Embodiment 20 | 240 | No crack | No crack |
| Embodiment 21 | 240 | No crack | No crack |
| Embodiment 22 | 240 | No crack | No crack |
| Embodiment 23 | 240 | No crack | Slightly cracked |
| Embodiment 24 | 240 | No crack | No crack |
| Embodiment 25 | 240 | No crack | No crack |
| Embodiment 26 | 240 | No crack | No crack |
| Embodiment 27 | 240 | Slightly cracked | Cracked |
| Embodiment 28 | 240 | No crack | Slightly cracked |
| Embodiment 29 | 240 | No crack | No crack |
| Embodiment 30 | 240 | No crack | No crack |
| Embodiment 31 | 240 | Slightly cracked | Cracked |
| Embodiment 32 | 240 | No crack | Slightly cracked |
| Embodiment 33 | 240 | No crack | No crack |
| Embodiment 34 | 240 | No crack | No crack |
| Comparative Embodiment 1 | 240 | Slightly cracked | Severely cracked |
| Comparative Embodiment 2 | 240 | No crack | Slightly cracked |
| Comparative Embodiment 3 | 240 | No crack | Slightly cracked |
| Comparative Embodiment 4 | 240 | No crack | Slightly cracked |
| Comparative Embodiment 5 | 240 | No crack | Slightly cracked |
| Comparative Embodiment 6 | 240 | No crack | Slightly cracked |
| Comparative Embodiment 7 | 240 | No crack | Slightly cracked |
| Comparative Embodiment 8 | 240 | No crack | Severely cracked |
| Comparative Embodiment 9 | 240 | No crack | Slightly cracked |
| Comparative Embodiment 10 | 240 | No crack | Slightly cracked |
| Comparative Embodiment 11 | 240 | No crack | Slightly cracked |

TABLE 3

| Serial number | Discharge DCR of a 50% SOC battery | 5 C capacity retention rate | First-cycle coulombic efficiency | Lithium plating status on an interface of a fully charged battery |
|---|---|---|---|---|
| Embodiment 1 | 40.1 mΩ | 52% | 88.82% | No lithium plating |
| Embodiment 2 | 40.6 mΩ | 51.9% | 87.49% | No lithium plating |
| Embodiment 3 | 40.2 mΩ | 51.7% | 87.55% | No lithium plating |
| Embodiment 4 | 40.5 mΩ | 51.8% | 87.57% | No lithium plating |
| Embodiment 5 | 40.6 mΩ | 51.7% | 87.56% | No lithium plating |
| Embodiment 6 | 40.2 mΩ | 51.8% | 87.52% | No lithium plating |
| Embodiment 7 | 40.4 mΩ | 51% | 87.35% | No lithium plating |
| Embodiment 8 | 40.8 mΩ | 51.9% | 88.68% | No lithium plating |
| Embodiment 9 | 40.4 mΩ | 51.8% | 87.35% | No lithium plating |
| Embodiment 10 | 40.7 mΩ | 51.5% | 87.41% | No lithium plating |
| Embodiment 11 | 40.8 mΩ | 51.7% | 87.43% | No lithium plating |
| Embodiment 12 | 40.4 mΩ | 51.6% | 87.42% | No lithium plating |
| Embodiment 13 | 40.6 mΩ | 51.7% | 87.38% | No lithium plating |
| Embodiment 14 | 41.0 mΩ | 50.8% | 87.21% | No lithium plating |
| Embodiment 15 | 40.26 mΩ | 51.82% | 87.37% | No lithium plating |
| Embodiment 16 | 40.73 mΩ | 51.72% | 87.39% | No lithium plating |
| Embodiment 17 | 40.35 mΩ | 51.51% | 87.38% | No lithium plating |
| Embodiment 18 | 40.63 mΩ | 51.64% | 87.34% | No lithium plating |
| Embodiment 19 | 41.5 mΩ | 50.9% | 87.22% | No lithium plating |
| Embodiment 20 | 41.1 mΩ | 51.2% | 88.04% | No lithium plating |
| Embodiment 21 | 40.9 mΩ | 51.4% | 88.30% | No lithium plating |
| Embodiment 22 | 41.5 mΩ | 50.8% | 87.40% | No lithium plating |
| Embodiment 23 | 41.4 mΩ | 50.9% | 87.98% | No lithium plating |
| Embodiment 24 | 40.7 mΩ | 51.5% | 87.83% | No lithium plating |
| Embodiment 25 | 40.5 mΩ | 51.2% | 88.03% | No lithium plating |
| Embodiment 26 | 41.7 mΩ | 51.0% | 87.22% | No lithium plating |
| Embodiment 27 | 42.0 mΩ | 50.8% | 87.50% | No lithium plating |
| Embodiment 28 | 41.09 mΩ | 51.8% | 87.2% | No lithium plating |
| Embodiment 29 | 40.34 mΩ | 51.4% | 87.5% | No lithium plating |
| Embodiment 30 | 40.8 mΩ | 51.3% | 87.6% | No lithium plating |
| Embodiment 31 | 41.8 mΩ | 50.8% | 87.4% | No lithium plating |
| Embodiment 32 | 40.56 mΩ | 50.9% | 87.6% | No lithium plating |
| Embodiment 33 | 41.0 mΩ | 51.0% | 87.6% | No lithium plating |

TABLE 3-continued

| Serial number | Discharge DCR of a 50% SOC battery | 5 C capacity retention rate | First-cycle coulombic efficiency | Lithium plating status on an interface of a fully charged battery |
|---|---|---|---|---|
| Embodiment 34 | 41.02 mΩ | 50.8% | 87.4% | No lithium plating |
| Comparative Embodiment 1 | 42.3 mΩ | 50.0% | 87.2% | No lithium plating |
| Comparative Embodiment 2 | 42.5 mΩ | 50.0% | 87.0% | Slight lithium plating |
| Comparative Embodiment 3 | 43.2 mΩ | 50.4% | 87.1% | Slight lithium plating |
| Comparative Embodiment 4 | 43.4 mΩ | 50.6% | 87.2% | Slight lithium plating |
| Comparative Embodiment 5 | 42.8 mΩ | 50.7% | 86.9% | Slight lithium plating |
| Comparative Embodiment 6 | 42.1 mΩ | 49.8% | 86.8% | Slight lithium plating |
| Comparative Embodiment 7 | 42.5 mΩ | 49.3% | 86.0% | Slight lithium plating |
| Comparative Embodiment 8 | 42.7 mΩ | 49.5% | 86.5% | No lithium plating |
| Comparative Embodiment 9 | 43.5 mΩ | 49.2% | 86.7% | No lithium plating |
| Comparative Embodiment 10 | 43.7 mΩ | 49.3% | 86.4% | Slight lithium plating |
| Comparative Embodiment 11 | 43.8 mΩ | 48.9% | 86.0% | Severe lithium plating |

As can be seen from Table 1, all the POSS-containing block copolymer, the polyester containing the —[O—CH$(CH_3)$—C(═O)]— structural unit, and the second plasticizer can effectively reduce the surface tension of the deionized water. Especially, when the POSS-containing block copolymer and/or the polyester containing the —[O—CH$(CH_3)$—C(═O)]— structural unit are used in combination with the second plasticizer, the effect of reducing the surface tension of the ionized water is more noticeable. Therefore, as shown in Table 2, in the negative electrode plates prepared from the negative electrode slurries of Embodiments 1 to 34 and Comparative Embodiments 2 to 11, when the slurry is applied at a coating speed of 40 m/min and 60 m/min separately, the degree of cracking of the film layer is much lower than that of Comparative Embodiment 1.

However, as can be seen from Table 3, adding a second plasticizer alone into the negative electrode slurry brings an adverse effect on the performance of the secondary battery. Specifically, in contrast to Comparative Embodiment 1 in which no plasticizer is added, the internal resistance of the secondary batteries of Comparative Embodiments 2 to 11 doped with only the second plasticizer is significantly increased, and the rate performance and the first-cycle coulombic efficiency of the secondary batteries in some comparative embodiments are also deteriorated. A relatively high dosage of the second plasticizer also affects the interface properties of the secondary battery, and results in lithium plating on the negative electrode, thereby reducing the safety performance of the secondary battery. In contrast, the negative electrode slurries of Embodiments 1 to 34 include the first plasticizer and optionally the second plasticizer. Therefore, the prepared negative electrode plate, when applied to the secondary battery, can make the secondary battery achieve a lower internal resistance, good rate performance, high first-cycle coulombic efficiency, and good interface properties. Especially, when the negative electrode slurry includes both the first plasticizer and the second plasticizer, the prepared negative electrode plate, when applied to the secondary battery, can further reduce the internal resistance of the secondary battery and improve the rate performance, first-cycle coulombic efficiency, and interface properties of the secondary battery. In this way, the prepared secondary battery is superior in cycle performance, rate performance, and safety performance.

What is described above is merely specific embodiments of this application, but is not intended to limit the protection scope of this application. Various equivalent modifications and replacements conceivable by any person skilled in the art without departing from the technical scope disclosed herein still fall within the protection scope of this application. Therefore, the protection scope of this application is subject to the protection scope of the claims.

What is claimed is:

1. A negative electrode composition, comprising a negative active material and a plasticizer, wherein:

the plasticizer comprises a first plasticizer and a second plasticizer;

the first plasticizer comprises a polyester containing a —[O—CH$(CH_3)$—C(═O)]— structural unit, wherein the polyester containing the —[O—CH$(CH_3)$—C(═O)]— structural unit has a structural formula represented by Formula 2:

Formula 2

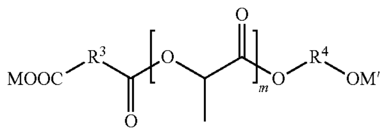

in Formula 2, m represents an integer of 60 to 170, $R^3$ and $R^4$ each independently represent one of following groups substituted or unsubstituted by $R^c$: $C_1$ to $C_8$ alkyl, $C_1$ to $C_8$ alkoxyl, $C_2$ to $C_8$ alkenyl, or $C_2$ to $C_8$ alkynyl, and $R^c$ represents at least one of halogen, amino, cyano, amido, hydroxyl, mercapto, $C_1$ to $C_8$ alkyl, or $C_1$ to $C_8$ alkoxyl, and M and M' each independently represent alkali metal or alkaline earth metal;

the second plasticizer comprises an organic solvent with a boiling point $T_m$ of 160° C. to 250° C.; and a weight-average molecular weight of the polyester containing the —[O—CH($CH_3$)—C(═O)]— structural unit is 5000 to 15000.

2. The negative electrode composition according to claim 1, wherein:

the second plasticizer comprises a dihydric alcohol with a boiling point $T_m$ of 160° C. to 250° C.

3. The negative electrode composition according to claim 1, wherein:

the first plasticizer further comprises a polyhedral oligomeric silsesquioxane (POSS) cage-type polysilsesquioxane derivative compound.

4. The negative electrode composition according to claim 3, wherein:

a weight-average molecular weight of the (POSS) cage-type polysilsesquioxane derivative compound is 10000 to 30000.

5. The negative electrode composition according to claim 3, wherein:

the (POSS) cage-type polysilsesquioxane derivative compound includes a POSS head group $[Y]_{p-q}$-$[SiO_{1.5}]_p$ and q polymer tail chains linked through a link group;

p is an even number from 6 to 20;

1≤q≤p;

Y represents a non-reactive group;

the link group is a single bond, $C_1$ to $C_8$ alkylidene, $C_1$ to $C_8$ alkyleneoxy, $C_1$ to $C_8$ alkylenethio, $C_2$ to $C_8$ alkenylene, or $C_2$ to $C_8$ alkynylene;

the q polymer tail chains each independently comprise at least one of structural units represented by Formula 1:

Formula 1

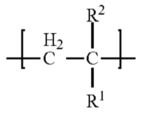

$R^1$ represents —(C═O)O$R^{11}$ or —O(C═O)$R^{12}$, $R^{11}$ and $R^{12}$ each independently represent one or at least two of following groups substituted or unsubstituted by a $R^b$ group: $C_1$ to $C_8$ alkyl, $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl, $C_1$ to $C_8$ aliphatic heterocyclyl, $C_6$ to $C_{10}$ aryl, and $C_2$ to $C_{10}$ heteroaryl, and $R^b$ represents at least one of halogen, hydroxyl, carboxyl, amino, cyano, amido, sulfonic acid group, sulfinic acid group, phenyl, $C_1$ to $C_8$ alkyl, or $C_1$ to $C_8$ alkoxyl; and $R^2$ represents at least one of hydrogen, $C_1$ to $C_8$ alkyl, $C_1$ to $C_8$ alkoxyl, $C_1$ to $C_8$ alkylthio, $C_2$ to $C_8$ alkenyl, $C_2$ to $C_8$ alkynyl, $C_3$ to $C_8$ alicyclyl, $C_1$ to Co aliphatic heterocyclyl, $C_6$ to $C_{10}$ aryl, halogen, phenyl, $C_3$ to $C_8$ alicyclyl, $C_6$ to $C_{10}$ aryl, or $C_2$ to $C_{10}$ heteroaryl.

6. The negative electrode composition according to claim 1, wherein, based on a total mass of the negative electrode composition, a mass percent of the plasticizer is 0.1% to 0.6%.

7. The negative electrode composition according to claim 6, wherein the plasticizer satisfies at least one of following conditions:

based on the total mass of the negative electrode composition, a mass percent of the second plasticizer is less than or equal to 0.3%; and a mass ratio between the first plasticizer and the second plasticizer is 1:(0.15 to 6).

8. The negative electrode composition according to claim 1, further comprising at least one of a conductive agent, a binder, or a thickener.

9. A negative electrode slurry, comprising a solvent and the negative electrode composition according to claim 1.

10. The negative electrode slurry according to claim 9, wherein the negative electrode slurry satisfies at least one of following conditions:

the solvent is water;

a solid content of the negative electrode slurry is 45% to 58%;

a viscosity of the negative electrode slurry is 4000 mPa·s to 15000 mPa·s;

a solid coating concentration of the negative electrode slurry is greater than or equal to 210 mg/1540.25 $mm^2$; and a coating speed of the negative electrode slurry is greater than or equal to 60 m/min.

11. A negative electrode plate, comprising:

a negative current collector; and a negative film layer located on at least one surface of the negative current collector, wherein the negative film layer comprises the negative electrode composition according to claim 1.

12. The negative electrode plate according to claim 11, wherein the negative electrode plate satisfies at least one of following conditions:

based on a total mass of the negative electrode plate, a mass percent of the second plasticizer is less than 100 ppm;

a thickness of the negative film layer on a single side of the negative current collector is 80 μm to 120 μm;

a compacted density of the negative film layer is 1.3 $g/cm^3$ to 1.7 $g/cm^3$; and a thickness of the negative current collector is less than or equal to 8 μm.

13. A secondary battery, comprising the negative electrode plate according to claim 11.

14. An electrical device, comprising the secondary battery according to claim 13.

* * * * *